(12) United States Patent
Tomatsu et al.

(10) Patent No.: US 12,420,536 B2
(45) Date of Patent: Sep. 23, 2025

(54) MULTILAYER BODY, AND PACKAGE USING SAME

(71) Applicant: TOYOBO CO., LTD., Osaka (JP)

(72) Inventors: Wakato Tomatsu, Inuyama (JP); Tadashi Nishi, Inuyama (JP); Tomoya Nishiki, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 230 days.

(21) Appl. No.: 18/260,877

(22) PCT Filed: Dec. 16, 2021

(86) PCT No.: PCT/JP2021/046571
§ 371 (c)(1),
(2) Date: Jul. 10, 2023

(87) PCT Pub. No.: WO2022/153782
PCT Pub. Date: Jul. 21, 2022

(65) Prior Publication Data
US 2024/0308187 A1    Sep. 19, 2024

(30) Foreign Application Priority Data
Jan. 15, 2021    (JP) .................................. 2021-005135

(51) Int. Cl.
*B32B 27/08*    (2006.01)
*B32B 15/088*    (2006.01)
(Continued)

(52) U.S. Cl.
CPC ............ *B32B 27/08* (2013.01); *B32B 15/088* (2013.01); *B32B 15/09* (2013.01); *B32B 15/20* (2013.01);
(Continued)

(58) Field of Classification Search
CPC .......... C08L 23/04; C08L 23/12; C08L 23/16; C08L 23/0815; B32B 27/20; B32B 27/34;
(Continued)

(56) References Cited

U.S. PATENT DOCUMENTS

| | | |
|---|---|---|
| 2020/0392327 A1 | 12/2020 | Tomatsu et al. |
| 2021/0283889 A1 | 9/2021 | Tomatsu et al. |
| 2022/0348752 A1 | 11/2022 | Tomatsu et al. |

FOREIGN PATENT DOCUMENTS

| | | |
|---|---|---|
| JP | H08-198320 A | 8/1996 |
| JP | 2013-100119 A | 5/2013 |

(Continued)

OTHER PUBLICATIONS

Translation of WO-2019021759-A1 (Year: 2019).*
(Continued)

*Primary Examiner* — Thomas M Wittenschlaeger
(74) *Attorney, Agent, or Firm* — Leydig, Voit & Mayer, Ltd.

(57) ABSTRACT

Provided is a multilayer body having favorable thermal dimensional stability and capable of producing a food-packaging bag where without providing any perforations or guiding lines through laser half-cutting, a resistance at opening by tearing is low, and only a small extent of parting occurs; and a step is formed between opening ends on the front and back sides to be easily opened and contents can easily be taken out therefrom. A multilayer body having one or more types of base material films; and a polyolefin-based resin sealant film made from a polyolefin-based resin composition containing a propylene-α-olefin random copolymer, wherein 1) the base material films have orientation angles, a sum of absolute values of which is 25° to 85°, 2) the sealant film has a piercing strength of 5.0 to 15.0 N, and 3)
(Continued)

the sealant film has an orientation coefficient ΔNx, in a longitudinal direction, of 0.0150 to 0.0230.

9 Claims, 4 Drawing Sheets

(51) Int. Cl.
    *B32B 15/09*     (2006.01)
    *B32B 15/20*     (2006.01)
    *B32B 27/34*     (2006.01)
    *B32B 27/36*     (2006.01)
    *B65D 75/26*     (2006.01)
    *B65D 75/58*     (2006.01)

(52) U.S. Cl.
    CPC .............. *B32B 27/34* (2013.01); *B32B 27/36* (2013.01); *B65D 75/26* (2013.01); *B65D 75/5805* (2013.01); *B32B 2307/308* (2013.01); *B32B 2307/31* (2013.01); *B32B 2307/414* (2013.01); *B32B 2307/516* (2013.01); *B32B 2307/581* (2013.01); *B32B 2307/5825* (2013.01); *B32B 2439/46* (2013.01)

(58) Field of Classification Search
    CPC ..... B32B 27/308; B32B 27/08; B32B 27/306; B32B 27/327; B32B 27/32; B32B 27/18; B32B 27/302; B32B 27/36; B32B 27/00; B32B 15/09; B32B 15/088; B32B 15/20; B32B 2264/0257; B32B 2264/00; B32B 2264/10; B32B 2307/308; B32B 2307/581; B32B 2307/5825; B32B 2307/30; B32B 2307/31; B32B 2307/518; B32B 2307/514; B32B 2307/736; B32B 2307/558; B32B 2307/414; B32B 2307/516; B32B 2439/06; B32B 2439/46; B32B 2439/70; B32B 2270/00; B32B 2250/24; B32B 2250/02; B65D 75/26; B65D 75/5805

See application file for complete search history.

(56) References Cited

FOREIGN PATENT DOCUMENTS

| | | | |
|---|---|---|---|
| JP | 2019-182460 A | 10/2019 | |
| JP | 2020-078908 A | 5/2020 | |
| WO | WO-2019021759 A1 * | 1/2019 | ............ B32B 37/15 |
| WO | WO 2019/123944 A1 | 6/2019 | |
| WO | WO 2020/022060 A1 | 1/2020 | |
| WO | WO 2020/255643 A1 | 12/2020 | |

OTHER PUBLICATIONS

Japan Patent Office, International Search Report in International Patent Application No. PCT/JP2021/046571 (Feb. 15, 2022).
European Patent Office, Extended European Search Report in European Patent Application No. 21919670.6 (Oct. 24, 2024).

* cited by examiner

MULTILAYER BODY, AND PACKAGE USING SAME

TECHNICAL FIELD

The present invention relates to a polyolefin-based resin sealant film. In addition, the present invention relates to a multilayer body with a biaxially oriented film made of at least one type of base material film selected from the group consisting of a polyamide-based resin film, a polyester-based resin film, and a polypropylene-based resin film.

BACKGROUND ART

A packaging bag is produced mainly by performing heating and pressure-bonding (hereinafter, heat sealing) of peripheral portions of multilayer bodies each composed of a polyolefin-based resin sealant film and a base material film such as a polyamide-based resin film, a polyester-based resin film, or a polypropylene-based resin film, at a temperature near the melting point of the polyolefin-based resin sealant film in a state where surfaces of the polyolefin-based resin sealant films are in contact with each other.

So-called retort pouches that are obtained by sterilizing, with steam under pressure at about 100° C., a packaging bag filled with food and that are suitable for preserving food for a long period, have been widely spread as food packaging bags.

In recent years, in view of social backgrounds such as advancement of women in society, nuclearization of the family, or progress of aging of population, demand for retort pouches has increased, and improvement of characteristics thereof has been concurrently demanded.

For example, for such retort pouches, a process in which they are boxed, transported, and sold at stores is often employed in recent years. Thus, the retort pouches are required to be unlikely to be broken even upon dropping thereof during this process and is particularly required to be unlikely to be broken even upon dropping thereof in a refrigerated state.

Meanwhile, when food contents are taken out from a packaging bag, particularly, a retort pouch, the packaging bag is often torn with hands from a cut (so-called notch) formed in a sealed portion on the periphery of the packaging bag. However, in the case of using conventional multilayer bodies, the packaging bag cannot be torn parallelly to one side, of the packaging bag, that ordinarily extends in the horizontal direction. Consequently, the packaging bag is opened diagonally, or a phenomenon (so-called parting) occurs in which the progress direction of tearing becomes opposite between the multilayer body forming the front surface of the packaging bag and the multilayer body forming the back surface of the packaging bag, i.e., between the upper and lower sides of the packaging bag. Thus, it might become difficult to take out the food contents, the food contents might stain a hand or clothes, and, in a case where the contents have been heated, a burn or the like might result.

The reason why it is difficult to tear the packaging bag parallelly to one side of the packaging bag is that there is a strain in the orientation axis of a base material film used for each of the multilayer bodies, i.e., the direction of the molecular orientation axis of the base material film is not parallel to the one side of the package.

Such a problem does not arise if the direction of the molecular orientation axis of the base material film is set to be the same as the direction in which the packaging bag is torn. The direction of the molecular orientation axis at a center portion in the width direction of a produced wide stretched film is identical to the running direction of the film, and thus the center portion can be torn parallelly to one side of the packaging bag. However, at each of end portions in the width direction of the film, the direction of the molecular orientation axis is tilted, and the direction in which the packaging bag is torn is tilted. It is unrealistic to supply the contents by completely avoiding the base material film at which the end portion in the width direction of the film is used. Moreover, in association with increase in production speed for base material films and increase in the widths of the base material films, the extent of strain tends to be larger than that in conventional art.

Considering this, it is attempted to solve such a problem by adjusting a polyolefin-based resin sealant film that is laminated with the base material film.

As in Patent Literature 1, a multilayer body has been known, the multilayer body being such that a perforated intermittent line is formed in one layer of each of a film on the front side of a pouch and a film on the back side of the pouch which each compose the multilayer body (FIG. 1). However, the position at which the perforations are formed is the same between the front and the back in a height direction orthogonal to the above width direction, and thus, even after opening, a take-out port is in a state of being closed, and an end of a cut cannot be picked with fingers. Therefore, a problem arises in that the take-out port is not opened and it is difficult to take out the contents (FIG. 2).

In addition, as in Patent Literature 2, a technology has been known in which, when perforations are formed in one layer of each of a film on the front side of a pouch and a film on the back side of the pouch which each compose a multilayer body, two lines of perforations are formed in a staggered pattern on the front side and perforations are formed on the back side so as to be located between projections, formed in the thickness direction, of the two lines so that a step is formed between an opening end on the front side and an opening end on the back side, to make it easy to pick an end of a cut with fingers. However, when the perforations are formed, film powder is generated, whereby a problem arises in that contamination occurs in a process.

In addition, as in Patent Literature 3, a technology has been known in which, when a guiding line is formed in one layer of each of a film on the front side of a pouch and a film on the back side of the pouch which each compose a multilayer body, the guiding lines are extended substantially parallelly to each other in a non-sealed portion at a predetermined interval, to make it easy to pick an end of a cut with fingers. However, problems arise in that: the process is complicate; and it is impossible to perform adjustment to the shapes of various packages. However, a sealant film described in Patent Literature 4 can be torn parallelly to one side of a packaging bag.

CITATION LIST

Patent Literature

Patent Literature 1: Japanese Laid-Open Patent Publication No. H8-198320
Patent Literature 2: Japanese Laid-Open Patent Publication No. 2013-100119
Patent Literature 3: Japanese Laid-Open Patent Publication No. 2019-182460

Patent Literature 4: International Publication No. 2019/123944

SUMMARY OF THE INVENTION

Problems to be Solved by the Invention

The present invention provides a multilayer body that has favorable thermal dimensional stability and from which it is possible to produce a food packaging bag in which: without providing any perforations or guiding lines through laser half-cutting or the like, a resistance at the time of opening by tearing is low, and only a small extent of parting occurs; and furthermore, a step can be formed between opening ends on the front side and the back side at the time of opening so that the food packaging bag can easily be opened and contents can easily be taken out therefrom.

The present inventor conducted thorough studies to attain this object. As a result, the present inventor found that, if a material film having a strain in a molecular orientation axis and a polyolefin-based resin sealant film having a specific molecular orientation are stacked to obtain a multilayer body, the multilayer body has favorable thermal dimensional stability and it is possible to produce therefrom a food packaging bag in which: without providing any perforations or guiding lines through laser half-cutting or the like, a resistance at the time of opening by tearing is low, and only a small extent of parting occurs; and a step can be formed between opening ends on the front side and the back side at the time of opening so that the food packaging bag can easily be opened and contents can easily be taken out therefrom. Consequently, the present inventor arrived at completion of the present invention. Specifically, the present invention has the following aspects.

[1] A multilayer body comprising:
one or more types of base material films; and
a polyolefin-based resin sealant film made from a polyolefin-based resin composition containing a propylene-α-olefin random copolymer, wherein
the following conditions 1) to 3) are satisfied,
1) the one or more types of base material films have orientation angles, a sum of absolute values of which is not smaller than 25 degrees and not larger than 85 degrees,
2) the polyolefin-based resin sealant film has a piercing strength of not lower than 5.0 N and not higher than 15.0 N, and
3) the polyolefin-based resin sealant film has an orientation coefficient $\Delta Nx$, in a longitudinal direction, of not smaller than 0.0150 and not larger than 0.0230.

[2] The multilayer body according to [1], wherein
the polyolefin-based resin composition contains the propylene-α-olefin random copolymer and one or more types of elastomers selected from the group consisting of an ethyne-propylene copolymer elastomer, a propylene-butene copolymer elastomer, and an ethylene-butene copolymer elastomer.

[3] The multilayer body according to [1] or [2], wherein
the polyolefin-based resin composition contains a propylene-α-olefin random copolymer having a melting point of not lower than 120° C. and lower than 140° C., in an amount of not lower than 10 parts by weight and not higher than 40 parts by weight with respect to a total amount of 100 parts by weight of polyolefin-based resins that form the polyolefin-based resin composition.

[4] The multilayer body according to any one of [1] to [3], wherein
the polyolefin-based resin composition contains a copolymer selected from the group consisting of a propylene-ethylene block copolymer and a propylene-α-olefin random copolymer having a melting point of not lower than 140° C., in an amount of not lower than 40 parts by weight and not higher than 85 parts by weight with respect to a total amount of 100 parts by weight of polyolefin-based resins that form the polyolefin-based resin composition.

[5] The multilayer body according to any one of [1] to [4], wherein
the base material films are one or more types of base material films selected from the group consisting of a polyamide-based resin film, a polyester-based resin film, and a polypropylene-based resin film.

[6] The multilayer body according to any one of [1] to [5], wherein
the multilayer body has a tear strength, in the longitudinal direction, of not lower than 100 mN and not higher than 1000 mN.

[7] The multilayer body according to [6], wherein
the multilayer body has a heat sealing strength of not lower than 35 N/15 mm.

[8] A package comprising the multilayer body according to any one of [1] to [7], wherein
a distance between opening ends on a front surface and a back surface of the package when the package is opened by being torn in the longitudinal direction is not shorter than 1.0 mm and not longer than 10.0 mm.

[9] The package according to [8], for use in retorting.

Advantageous Effects of the Invention

The multilayer body in the present invention has favorable thermal dimensional stability and is suitable for providing a package in which: without providing any perforations or guiding lines through laser half-cutting or the like, a resistance at the time of opening by tearing is low, and only a small extent of parting occurs; a step can be formed between opening ends on the front side and the back side at the time of opening; and adaptation to various package shapes can be achieved.

Hereinafter, the present invention will be described in detail with reference to the drawings as well. The present invention is not limited to an embodiment described below.

The present invention relates to a multilayer body including: one or more types of base material films; and a polyolefin-based resin sealant film made from a polyolefin-based resin composition containing a propylene-α-olefin random copolymer, wherein
the following conditions 1) to 3) are satisfied,
1) the one or more types of base material films have orientation angles, a sum of absolute values of which is not smaller than 25 degrees and not larger than 85 degrees,
2) the polyolefin-based resin sealant film has a piercing strength of not lower than 5.0 N and not higher than 15.0 N, and
3) the polyolefin-based resin sealant film has an orientation coefficient $\Delta Nx$, in a longitudinal direction, of not smaller than 0.0150 and not larger than 0.0230.

BRIEF DESCRIPTION OF THE DRAWINGS

FIG. 1 shows a conventional general package provided with perforations through laser half-cutting or the like.

DESCRIPTION OF THE REFERENCE CHARACTERS 10 general package produced by using multilayer body in present invention
11 heat-sealed portion on right side when drawings are viewed
12 heat-sealed portion on left side when drawings are viewed
13 heat-sealed portion on bottom side
14 heat-sealed portion on top side
15 accommodating portion of package
16 notch for opening
17 notch for opening
21 start point of opening by tearing
22 film (multilayer body) on near side when drawings are viewed
23 film (multilayer body) on far side when drawings are viewed
24 end point of opening by tearing FIG. 3 is a plan schematic diagram of a general package (retort pouch) produced by using a multilayer body in the present invention. A packaging bag 10 is obtained by, with the horizontal direction being defined as a film longitudinal direction, sealing three sides of the substantially rectangular peripheral edges of two substantially rectangular multilayer sheets forming a front side and a back side to make the sealed sides into side sealed portions 11 and 12 and a bottom sealed portion 13 and providing an accommodating portion 15 in an internal non-sealed portion so that the resultant product is made into the shape of a bag. The bag can be filled with contents from a top side that is the remaining one side of the substantial rectangle. After the bag is filled with the contents, the remaining one side can be sealed in the same manner to achieve tight sealing. The sealed portion at the top side is denoted by 14, and the accommodating portion 15 is filled with, for example, contents such as food stuff.

The package 10 may have cut portions (notches) 16 and 17 from either of which a cut is to originate. Regarding the shape of each cut portion, a known notch such as an I-notch, a V-notch, a notch in the shape of a tortoiseshell, or a mere slit can be used. In the case where the package 10 has a cut portion, the cut portion is preferably formed at each of two locations at end portions of the bag but may be formed at one location. The package 10 has not been subjected to machining such as laser half-cutting.

Figure 1:
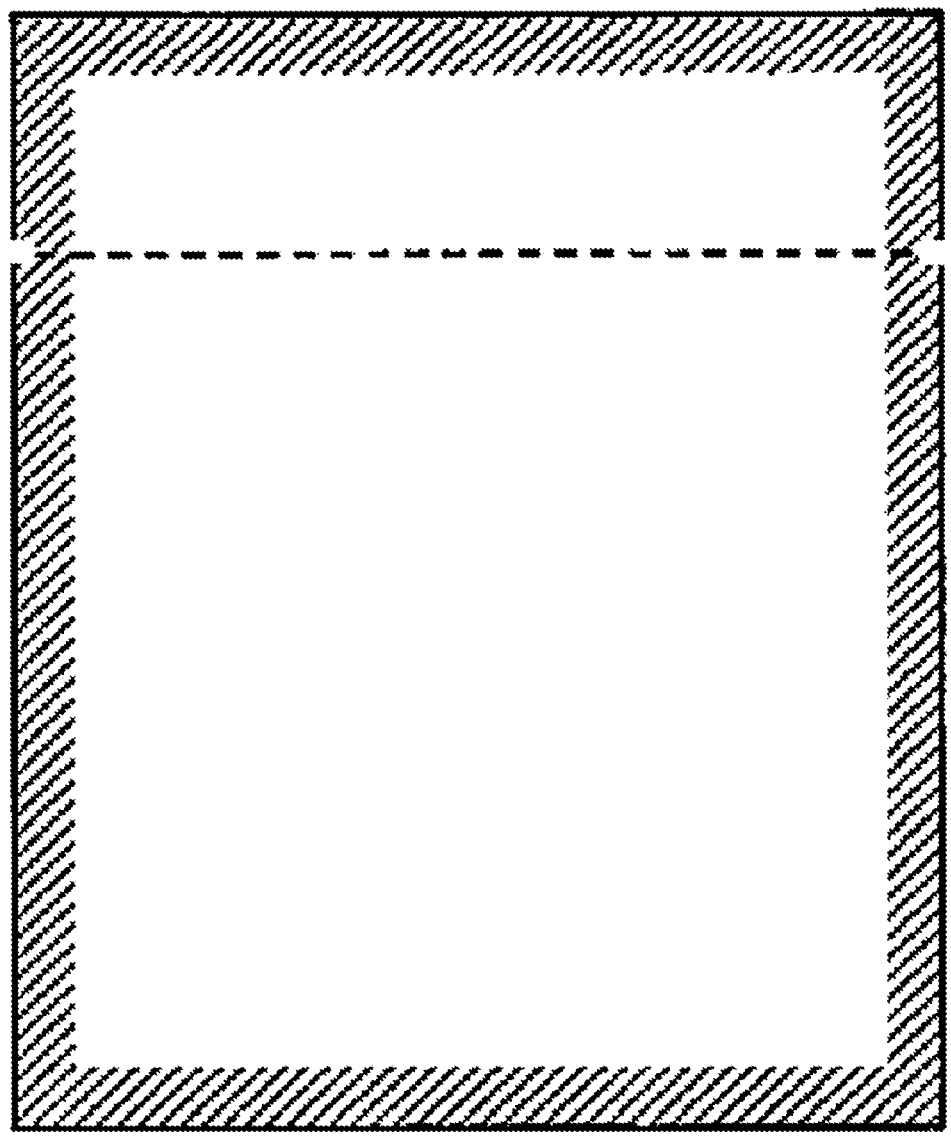
Figure 2:
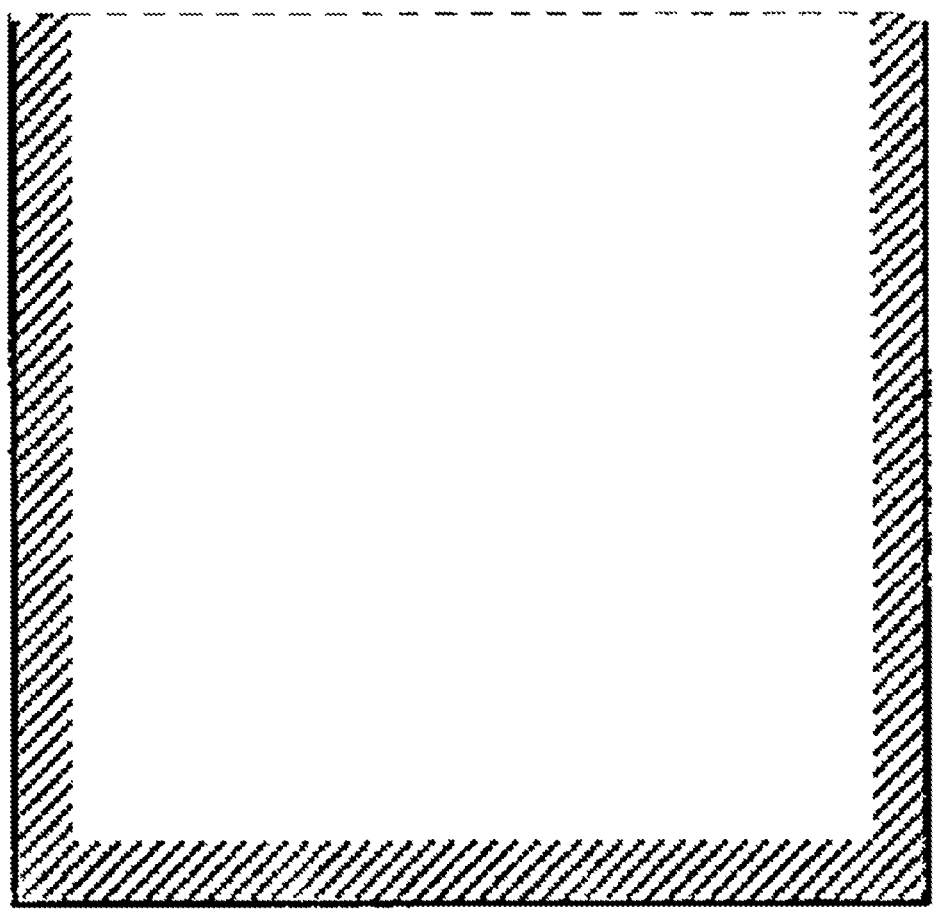
FIG. 2 shows a shape taken after the conventional general package is opened by being torn from a notch.
Figure 3:
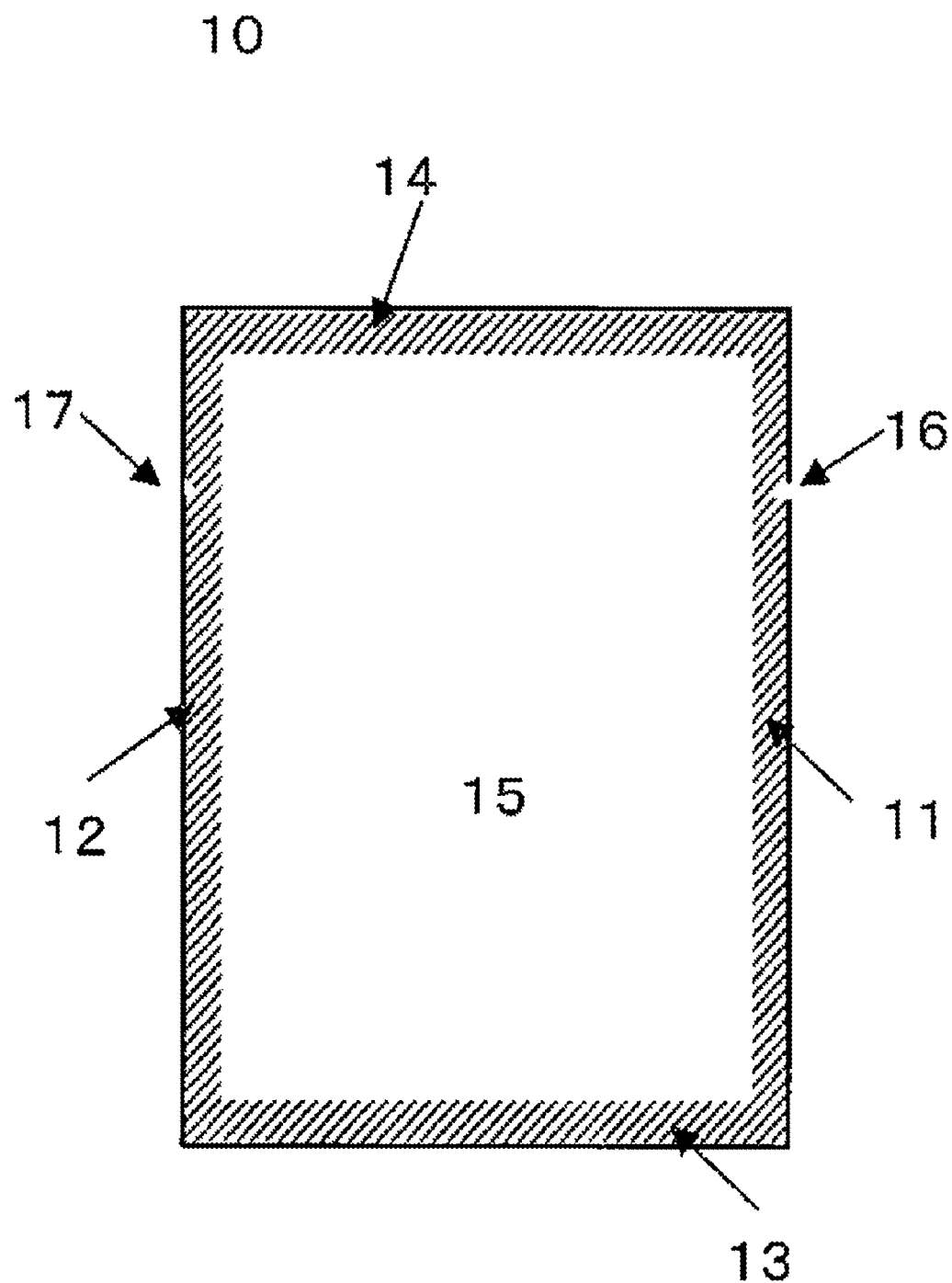
FIG. 3 shows a general package produced by using a multilayer body in the present invention.
Figure 4:
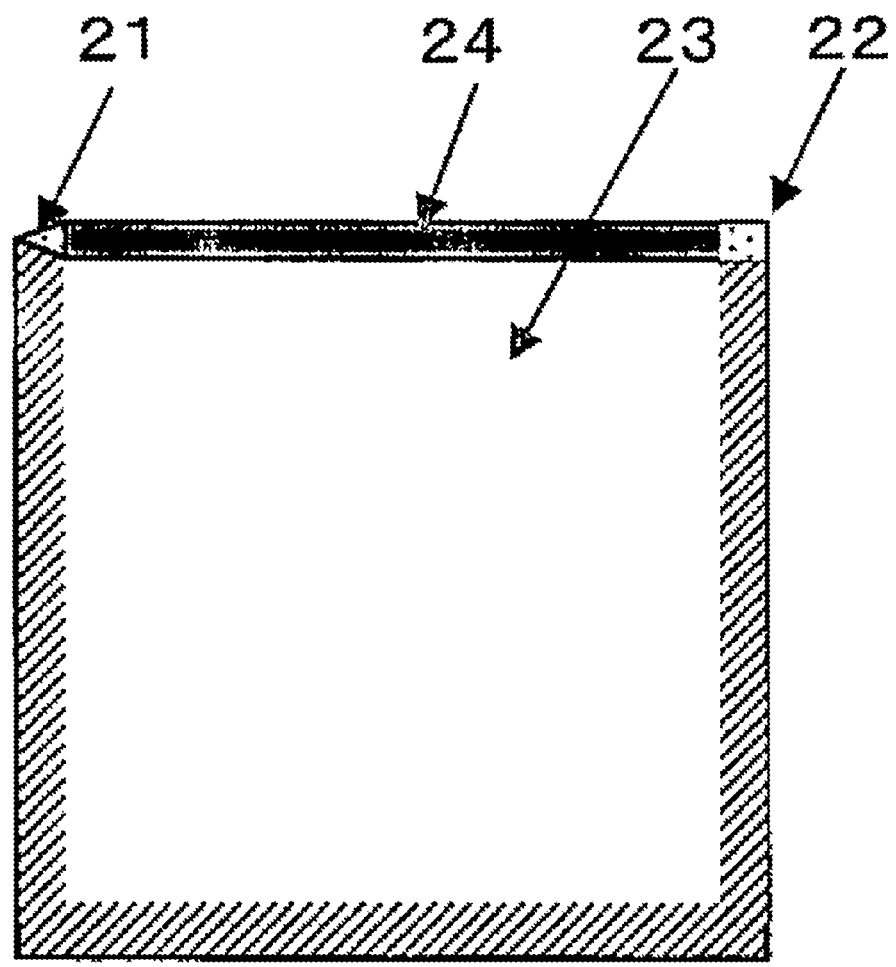
FIG. 4 shows a shape taken after the package in the present invention is opened by being torn from a notch.

In a case where the package in FIG. 3 is opened by being torn from either of the notches with hands, the opening is favorably performed as shown in FIG. 4. If the package is torn from the cut 21 on the left side when FIG. 3 is viewed, the corresponding sealed portion at the start point is first torn while a film 23 on the front side and a film 24 on the back side at the sealed portion are slightly shifted (parted) in directions opposite to each other. This is considered to happen for the following reason.

The orientation axis of a base material film is tilted relative to the longitudinal direction at the time of producing the base material film. Meanwhile, in a sealant film, the orientation in the longitudinal direction is disarrayed owing to thermal melting at the time of heat sealing. Therefore, break of the multilayer body composed of the base material film and the sealant film progresses in the orientation axis direction of the base material film. In a case where the film 23 on the front side and the film 24 on the back side are each produced by halving one film such that the longitudinal direction thereof is set to the horizontal direction, the orientation axes thereof are oriented so as to be line-symmetric about the longitudinal direction and are shifted to mutually opposite sides.

Next, in a non-sealed portion, the orientation in the longitudinal direction of the sealant film is stronger than the orientation of the base material film, and thus break of the multilayer body progresses parallelly to the horizontal direction and reaches a sealed portion 22, on the opposite side, which is an end point of opening by tearing. At the sealed portion 22, a film piece having been torn off can easily be separated.

(Base Material Film)

A material of the base material film used for the multilayer body in the present invention is not particularly limited, and examples of the base material film include polyamide-based resin films, polyester-based resin films, polypropylene-based resin films, and the like. Among these films, only one type of film has to be selected. However, two or more types of films may be selected, or three or more types of films may be selected. In addition, a base material film obtained by subjecting these base material films to coating and vapor deposition treatment through known technologies for the purpose of imparting barrier properties and other functions, may be used. In addition, an aluminum foil may be additionally stacked for the purpose of imparting even higher barrier properties.

Among such base material films, a biaxially stretched nylon 6 film and a biaxially stretched nylon 66 film have excellent pinhole resistances and impact resistances, and thus are often used as packages for heavy objects. However, the nylon 6 film and the nylon 66 film have high dependences on an orientation angle in a tearing direction, and thus are likely to suffer significant parting. Meanwhile, the distance between open ends is elongated even with a comparatively small orientation angle, and thus a favorable openability is obtained.

A biaxially stretched polyethylene terephthalate film has excellent oxygen barrier properties and dimensional stability. Thus, this film is suitable for use in retorting at high temperature and has a comparatively low dependence on the orientation angle in the tearing direction. This film is characterized by suffering only a smaller extent of parting than the biaxially stretched nylon 6 film and the biaxially stretched nylon 66 film having the same orientation angle, but has an openability inferior to those of the nylon 6 film and the nylon 66 film.

Regarding the lower limit of the tilt, relative to the longitudinal direction, of the orientation axis of the base material film used for the multilayer body in the present invention, the tilt is preferably not smaller than 10 degrees, more preferably not smaller than 20 degrees, further preferably not smaller than 24 degrees, even more preferably not smaller than 30 degrees, and particularly preferably not smaller than 35 degrees. If the tilt is not smaller than 10 degrees, a step is easily formed between opening ends of the package. The upper limit of the tilt, relative to the longitudinal direction, of the orientation axis of the base material film used for the multilayer body in the present invention is preferably 45 degrees and more preferably 40 degrees. If the tilt is not larger than 45 degrees, the extent of parting becomes likely to decrease.

In a case where a plurality (two or more types, or three or more types) of base material films and the polyolefin-based resin sealant film are stacked, the number of base material films having orientation axes in directions different from the longitudinal direction increases, and thus the stacking acts so as to increase the extent of parting. There is also a case where a plurality of base material films having orientation axes tilted to mutually opposite sides may be stacked, and, in this case as well, the stacking acts so as to increase the extent of parting without offsetting. This is considered to happen owing to complication of the progress direction of break.

The upper limit of the sum of absolute values of the tilts, relative to the longitudinal direction, of the orientation axes of the base material films used for the multilayer body in the present invention is preferably 85 degrees. The upper limit is more preferably 80 degrees and further preferably 75 degrees. If the sum of absolute values is not larger than 85 degrees, the extent of parting becomes likely to decrease. The lower limit of the sum of absolute values of the tilts, relative to the longitudinal direction, of the orientation axes of the base material films used for the multilayer body in the present invention is preferably 25 degrees. The sum of absolute values is more preferably not smaller than 30 degrees, further preferably not smaller than 35 degrees, and even more preferably not smaller than 38 degrees. If the sum of absolute values is not smaller than 25 degrees, the distance between opening ends is likely to be elongated.

In the case where a plurality of base material films and the polyolefin-based resin sealant film in the present invention are stacked, a shrinkage rate at the time of heating such as retort sterilization tends to be lower if a plurality of base material films having orientation axes tilted to mutually opposite sides are stacked. Meanwhile, a tearing strength tends to be lower than if a plurality of base material films having orientation axes tilted to the mutually same side are stacked.

In a case where the plurality (three or more types) of base material films and the polyolefin-based resin sealant film in the present invention are stacked, the tearing strength and the shrinkage rate at the time of heating such as retort sterilization are unlikely to increase if the base material films have no orientations.

The upper limit of the tear strength in the longitudinal direction of each base material film used for the multilayer body in the present invention is preferably 500 mN. A tear strength higher than this upper limit might make it difficult to tear the laminate film. The upper limit is more preferably 400 mN and further preferably 300 mN.

The lower limit of the thickness of the base material film used for the multilayer body in the present invention is preferably 7 μm and more preferably 12 μm. If the thickness is not smaller than 7 μm, the multilayer body comes to have favorable stiffness.

The upper limit of the thickness of the base material film used for the multilayer body in the present invention is preferably 30 μm and more preferably 25 μm. If the thickness is not larger than 30 μm, the resistance at the time of tearing is low.

(Polyolefin-Based Resin Sealant Film)

The polyolefin-based resin sealant film in the present invention may be a single layer or may be composed of a plurality of (two or more) layers. The polyolefin-based resin sealant film may be composed of, for example, a heat sealing layer/a laminate layer or may have a three-layer configuration composed of a heat sealing layer/an intermediate layer/a laminate layer. Further, each of the layers may be composed of a plurality of layers. The heat sealing layer refers to a layer located on an outermost surface side of the polyolefin-based resin sealant film. If thermocompression bonding is performed with the surfaces of the heat sealing layers facing each other, a package can be produced.

The layer located on an outermost surface side opposite to the heat sealing layer is the laminate layer and can be stacked by being pasted on the base material film such as a polyester-based resin film or a polyamide-based resin film.

In the case of the three-layer configuration composed of the heat sealing layer/the intermediate layer/the laminate layer, if an end portion of the multilayer body in the present invention or the multilayer body itself is collected and made into a pellet again and the pellet is used as a raw material for the intermediate layer, cost for the film product can also be decreased without impairing characteristics such as straight cuttability, ease of tearing, bag production processability, and resistance to bag breakage.

Polyolefin-based resins and additives that form a polypropylene-based resin composition in a case where the polyolefin-based resin sealant film used in the present invention is a single layer, will be described.

(Polypropylene-Based Resin Composition)

Polyolefin-based resins such as a propylene-ethylene block copolymer and a propylene-α-olefin random copolymer can be contained in the polypropylene-based resin composition that forms the sealant film used for the multilayer body in the present invention. In addition, a copolymer elastomer may be added for the purpose of improving impact resistance.

(Propylene-Ethylene Block Copolymer)

A propylene-ethylene block copolymer can be used in the present invention. The propylene-ethylene block copolymer in the present invention is a copolymer formed through multiple steps including: a first stage of polymerization step of forming a copolymerization component composed of a large amount of propylene and a small amount of ethylene; and a second stage of polymerization step of forming a copolymerization component composed of a small amount of propylene and a large amount of ethylene. Specifically, as described in Japanese Laid-Open Patent Publication No. 2000-186159, a propylene-ethylene block copolymer having been subjected to polymerization through a gas phase process is preferably used. Specifically, examples of the propylene-ethylene block copolymer include block copolymers obtained through: a first step of polymerizing a polymer moiety (component A) containing propylene as a main component, substantially in the absence of an inert solvent; and a second step of polymerizing, in a gas phase, a copolymer moiety (component B) that is composed of propylene and ethylene and that has an ethylene content of 20 to 50 parts by weight. However, the propylene-ethylene block copolymer is not limited thereto.

The melt flow rate (MFR) (measured at 230° C. and under a load of 2.16 kg) of the above propylene-ethylene block copolymer is preferably 1 to 10 g/10 minutes and more preferably 2 to 7 g/10 minutes. If the MFR is not lower than 1 g/10 minutes, extrusion through a T-die is easily performed. Meanwhile, if the MFR is not higher than 10 g/10 minutes, an impact resistance strength (impact strength) is easily increased.

In the present invention, a xylene soluble portion at 20° C. is referred to as CXS, and a xylene insoluble portion at 20° C. is referred to as CXIS. In the propylene-ethylene block copolymer used in the present invention, the CXS contains a rubber component (component B) as a main component, and the CXIS contains a polypropylene component (component A) as a main component. If the limiting viscosities of the CXS and the CXIS are respectively defined as [η]CXS and [η]CXIS, the values of the [η]CXS and the [η]CXIS are as follows. On one hand, the [η]CXS is preferably in a range of 1.8 to 3.8 dl/g and further preferably in a range of 2.0 to 3.1 dl/g. If the [η]CXS is not higher than 3.8 dl/g, fish eyes are unlikely to be generated on the polyolefin-based resin sealant film. Meanwhile, if the [η]CXS is not lower than 1.8 dl/g, the heat sealing strength between the polyolefin-based resin sealant films is unlikely to significantly decrease.

On the other hand, the [η]CXIS is preferably in a range of 1.0 to 3.0 dl/g. If the [η]CXIS is not higher than 3.0 dl/g, extrusion through a T-die is easily performed. Meanwhile, if the [η]CXIS is not lower than 1.0 dl/g, the impact resistance strength (impact strength) of the film is easily increased.

The above [η]CXS and [η]CXIS are values measured according to the following measurement method. 5 g of a sample is completely dissolved in 500 ml of boiling xylene, and then the temperature of the solution is decreased to 20° C., and the solution is left at rest for not shorter than 4 hours. Then, this solution is filtered to be separated into a filtrate and a precipitate, and the limiting viscosities ([η]) of a component (CXS) obtained by drying the filtrate and a solid substance (CXIS) obtained by drying the precipitate under reduced pressure at 70° C. are measured in tetralin at 135° C. by using an Ubbelohde type viscometer.

In general, it is known that a correlation is established between the MFR and the limiting viscosity η of the entire film. With knowledge of the limiting viscosity η of the film, an approximate MFR of the resin used can be known. The limiting viscosity η serves as a rough indication of molecular weight. A larger numerical value of the limiting viscosity η indicates a higher molecular weight, and a smaller numerical value of the limiting viscosity η indicates a lower molecular weight. The MFR serves as a rough indication of molecular weight. A smaller numerical value of the MFR indicates a higher molecular weight, and a larger numerical value of the MFR indicates a lower molecular weight.

The propylene-ethylene block copolymer is such that: the copolymerization proportion of the ethylene component in the propylene-ethylene block copolymer is preferably 1 to 15% by weight and preferably 3 to 10% by weight; and the copolymerization proportion of the propylene component in the propylene-ethylene block copolymer is preferably 85 to 99% by weight and preferably 90 to 97% by weight.

The lower limit of the melting point of the propylene-ethylene block copolymer is not particularly limited, but is preferably 120° C. and more preferably 125° C. If the melting point is not lower than 120° C., heat resistance is easily obtained, and inner surfaces of the bag are unlikely to be fused to each other at the time of retorting treatment. The upper limit of the melting point of the propylene-ethylene block copolymer is not particularly limited, but is preferably 175° C. and more preferably 170° C. If the melting point is not higher than 175° C., the heat sealing temperature is likely to decrease.

Specific examples of the propylene-ethylene block copolymer include: a block copolymerized polypropylene resin (WFS5293-22 manufactured by Sumitomo Chemical Co., Ltd., and having an MFR, at 230° C. and under a load of 2.16 kg, of 3.0 g/10 minutes and a melting point of 164° C.) in which the ethylene content is 7% by weight and the limiting viscosity η of the CXS is 3.0 dl/g; and a block copolymerized polypropylene resin (WFS5293-29 manufactured by Sumitomo Chemical Co., Ltd., and having an MFR, at 230° C. and under a load of 2.16 kg, of 3.0 g/10 minutes and a melting point of 164° C.) in which the ethylene content is 6% by weight and the limiting viscosity η of the CXS is 2.3 dl/g.

(Propylene-α-Olefin Random Copolymer)

An object of the present invention is to decrease the heat sealing temperature of the polyolefin-based resin sealant film. To this end, a propylene-α-olefin random copolymer is preferably added.

Examples of the propylene-α-olefin random copolymer can include a copolymer of: propylene; and at least one type of α-olefin having 2 to 20 carbon atoms, other than propylene. As such an α-olefin monomer having 2 to 20 carbon atoms, ethylene, butene-1, pentene-1, 4-methylpentene-1, hexene-1, octene-1, or the like can be used. Without any particular limitation, ethylene is preferably used as the α-olefin monomer from the viewpoint of compatibility with the propylene-ethylene block copolymer. Two or more types of propylene-α-olefin random copolymers can be mixed and used as necessary. A propylene-ethylene random copolymer is particularly preferable. In this document, when it comes to naming, monomers forming a random copolymer are described in an order starting from the monomer having the highest compositional proportion.

The lower limit of the melt flow rate (MFR), at 230° C. and under a load of 2.16 kg, of the propylene-α-olefin random copolymer is preferably 0.6 g/10 minutes, more preferably 1.0 g/10 minutes, and further preferably 1.2 g/10 minutes. If the MFR is not lower than 0.6 g/10 minutes, compatibility with the propylene-ethylene block copolymer is increased, and the film is unlikely to be whitened. The upper limit of the melt flow rate of the propylene-α-olefin random copolymer is preferably 10.0 g/10 minutes, more preferably 8.0 g/10 minutes, and further preferably 7.0 g/10 minutes.

In addition, the copolymerization proportion of the α-olefin component in the propylene-α-olefin random copolymer is preferably 1 to 15% by weight and preferably 3 to 10% by weight. The copolymerization proportion of the propylene component in the propylene-ethylene random copolymer is preferably 85 to 99% by weight and preferably 90 to 97% by weight.

The lower limit of the melting point of the propylene-α-olefin random copolymer is preferably 120° C. and more preferably 125° C. If the melting point is not higher than 120° C., the inner surfaces of the bag might be fused to each other at the time of retorting treatment. The upper limit of the melting point of the propylene-α-olefin random copolymer is preferably 160° C., more preferably 150° C., and further preferably 145° C. If the melting point is not higher than 160° C., the heat sealing temperature is likely to decrease.

At least one of the propylene-α-olefin random copolymers preferably has a low melting point. If a propylene-α-olefin random copolymer having a low melting point is contained, low-temperature sealability becomes favorable.

The lower limit of the melting point of at least one type of propylene-α-olefin random copolymer among the propylene-α-olefin random copolymers is preferably 120° C. and more preferably 125° C. If the melting point is not lower than 120° C., the inner surfaces of the bag are unlikely to be fused to each other at the time of retorting treatment. Regarding the upper limit of the melting point of the at least one type of propylene-α-olefin random copolymer, the melting point is preferably lower than 140° C. and more preferably lower than 137° C. If the melting point is lower than 140° C., the heat sealing temperature is likely to decrease.

The lower limit of the melting point of at least one type of propylene-α-olefin random copolymer among the propylene-α-olefin random copolymers is preferably 140° C. If the melting point is not lower than 140° C., the bag is unlikely to shrink at the time of retorting treatment. Regarding the upper limit of the melting point of the at least one type of propylene-α-olefin random copolymer, the melting point is preferably not higher than 160° C. and more preferably not higher than 150° C. If the melting point is lower than 140° C., the heat sealing temperature is likely to decrease.

Specific examples of the propylene-α-olefin random copolymer include: S131 (manufactured with a Ziegler-Natta catalyst and having an ethylene content of 5.5% by weight, a density of 890 kg/m$^3$, an MFR, at 230° C. and under a load of 2.16 kg, of 1.5 g/10 minutes, and a melting point of 132° C.) manufactured by Sumitomo Chemical Co., Ltd.; a propylene-ethylene random copolymer WFW4M (manufactured with a metallocene catalyst and having an ethylene content of 7% by weight, a density of 900 kg/m$^3$, an MFR, at 230° C. and under a load of 2.16 kg, of 7.0 g/10 minutes, and a melting point of 136° C.) manufactured by Japan Polypropylene Corporation; and the like.

A propylene homopolymer containing a metallocene-based olefin polymerization catalyst is characterized by, as compared with a propylene homopolymer containing a Ziegler-Natta-based olefin polymerization catalyst, having a narrower molecular weight distribution and containing smaller amounts of components on the low molecular weight side relative to a weight-average molecular weight serving as a reference and smaller amounts of components on the high molecular weight side relative to the weight-average molecular weight. It has also been newly found that generation of whiskers is inhibited if the propylene homopolymer containing the metallocene-based olefin polymerization catalyst is used. Further, excellent flexibility and excellent strength are obtained.

Here, the metallocene-based olefin polymerization catalyst refers to a catalyst composed of: a (i) transition metal compound (so-called metallocene compound) in group 4 of the periodic table including a ligand having a cyclopentadienyl backbone; a (ii) co-catalyst that reacts with the metallocene compound to be able to achieve activation to a stable ionic state; and, as necessary, an (iii) organic aluminum compound. Any of known catalysts can be used.

(Copolymer Elastomer)

A thermoplastic copolymer elastomer containing a polyolefin as a main component may be added to the sealant film of the multilayer body in the present invention for the purpose of improving the resistance, to bag breakage resulting from falling, of a packaging bag obtained by using the films in the present invention.

Regarding the copolymer elastomer in the present invention, as an olefin-based thermoplastic copolymer elastomer that exhibits rubber-like elasticity at around normal temperature, there is an ethylene-butene copolymer elastomer which is an amorphous or low-crystallinity elastomer obtained by copolymerizing ethylene and butene.

As an olefin-based thermoplastic copolymer elastomer that exhibits comparatively high Shore hardness and favorable transparency among elastomers, there is a propylene-butene copolymer elastomer which is a crystalline elastomer obtained by copolymerizing propylene and butene.

A desirable mode involves use of an ethylene-butene copolymer elastomer and an ethylene-propylene copolymer elastomer each having: a melt flow rate (MFR), at 230° C. and under a load of 2.16 kg, of 0.2 to 5.0 g/10 minutes; a density of 820 to 930 kg/m$^3$; and a molecular weight distribution (Mw/Mn), obtained through the GPC method, of 1.3 to 6.0. If the melt flow rate (MFR) under a load of 2.16 kg is lower than 0.2 g/10 minutes, evenness in kneading becomes insufficient, and fish eyes become likely to be generated. Meanwhile, a melt flow rate (MFR) higher than 5.0 g/10 minutes is not preferable from the viewpoint of resistance to bag breakage.

In the present invention, the limiting viscosity [η] of each of the ethylene-propylene copolymer elastomer, the propylene-butene copolymer elastomer, and the ethylene-butene copolymer elastomer is preferably 1.0 to 5.0 and suitably 1.2 to 3.0 from the viewpoint of maintaining heat sealing strength, maintaining impact strength, and bag strength against dropping. If the limiting viscosity [η] is lower than 1.0, evenness in kneading becomes insufficient, and fish eyes become likely to be generated. Meanwhile, a limiting viscosity [η] higher than 5.0 is not preferable from the viewpoint of resistance to bag breakage and heat sealing strength.

Specifically, the copolymer elastomer can be exemplified by: an ethylene-butene copolymer elastomer (TAFMERA1085S manufactured by Mitsui Chemicals, Inc.) having a density of 885 kg/m$^3$ and an MFR (at 230° C. and under 2.16 kg) of 1.4 g/10 minutes; a propylene-butene copolymer elastomer (TAFMER XM7070 manufactured by Mitsui Chemicals, Inc.) having a density of 900 kg/m$^3$ and an MFR (at 230° C. and under 2.16 kg) of 3 g/10 minutes; an ethylene-propylene copolymer elastomer (TAFMER P0480 manufactured by Mitsui Chemicals, Inc.) having a density of 870 kg/m$^3$ and an MFR (at 230° C. and under 2.16 kg) of 1.8 g/10 minutes; and the like.

(Additives)

In the sealant film of the multilayer body in the present invention, a polyolefin-based resin composition may contain an anti-blocking agent. The anti-blocking agent may be one type of anti-blocking agent. However, if two or more types of inorganic particles having different particle diameters and shapes are blended, more complicated protrusions are formed also on an uneven portion of the surface of the film, whereby a higher level of blocking prevention effect can be obtained.

The anti-blocking agent to be added is not particularly limited, and it is possible to add: inorganic particles of spherical silica, silica in infinite form, zeolite, talc, mica, alumina, hydrotalcite, aluminum borate, or the like; or organic particles of polymethyl methacrylate, ultrahigh-molecular-weight polyethylene, or the like.

The amount of the anti-blocking agent to be added with respect to the amount of the polyolefin-based resin composition is preferably not higher than 3000 ppm and more preferably not higher than 2500 ppm. If the amount is set to be not higher than 3000 ppm, the likeliness for the anti-blocking agent to fall off can be decreased.

In the sealant film of the multilayer body in the present invention, an organic lubricant may be added to the polyolefin-based resin composition. By doing so, slippage and the blocking prevention effect of the multilayer film are improved, and the handleability of the film is improved. The reason for this is considered to be because the organic lubricant bleeds out to be present on the surface of the film so that a lubricating effect and a release effect are exhibited.

As the organic lubricant, one that has a melting point of not lower than normal temperature is preferably added. Examples of the organic lubricant include fatty acid amides and fatty acid esters.

Specifically, the organic lubricant is oleic acid amide, erucic acid amide, behenic acid amide, ethylene bis-oleic acid amide, hexamethylene bis-oleic acid amide, ethylene bis-oleic acid amide, or the like. Although these organic lubricants may be used singly, two or more types of organic lubricants may be used in combination. Doing so enables slippage and the blocking prevention effect to be maintained even in a harsh environment, and thus is preferable.

In the polyolefin-based resin sealant film of the multilayer body in the present invention, an appropriate amount of an antioxidant, an antistatic agent, an antifogging agent, a neutralizer, a nucleating agent, a colorant, another additive, an inorganic filler, or the like can be blended, as necessary, in an arbitrarily-selected layer of the polyolefin-based resin composition as long as the object of the present invention is not impaired by doing so.

Examples of the manner of using the antioxidant include: a manner in which a phenol-based antioxidant and a phosphite-based antioxidant are used in combination; and a manner in which an antioxidant having a phenol-based backbone and a phosphite-based backbone in one molecule thereof is singly used. Examples of the neutralizer include calcium stearate and the like.

(Polyolefin-Based Resin Composition)

The polypropylene-based resin composition that forms the polyolefin-based resin sealant film of the multilayer body in the present invention contains a propylene-α-olefin random copolymer. It is preferable that the polyolefin-based resin composition contains: a propylene-α-olefin random copolymer; and one or more types of elastomers selected from the group consisting of an ethylene-propylene copolymer elastomer, a propylene-butene copolymer elastomer, and an ethylene-butene copolymer elastomer.

It is more preferable that the polyolefin-based resin composition contains a propylene-α-olefin random copolymer having a melting point of not lower than 120° C. and lower than 140° C., in an amount of not lower than 10 parts by weight and not higher than 40 parts by weight with respect to the total amount (100 parts by weight) of polyolefin-based resins that form the polyolefin-based resin composition.

It is further preferable that a copolymer selected from the group consisting of a propylene-ethylene block copolymer and a propylene-α-olefin random copolymer having a melting point of not lower than 140° C. is contained in an amount of not lower than 40 parts by weight and not higher than 85 parts by weight with respect to the total amount (100 parts by weight) of the polyolefin-based resins that form the polypropylene-based resin composition. In addition, the polyolefin-based resin composition contains at least one type of copolymer elastomer selected from an ethylene-propylene copolymer elastomer, an ethylene-butene copolymer elastomer, and a propylene-butene copolymer elastomer, in an amount of preferably not lower than 5 parts by weight and not higher than 20 parts by weight and more preferably not lower than 6 parts by weight and not higher than 15 parts by weight with respect to the total amount (100 parts by weight) of the polyolefin-based resins that form the polyolefin-based resin composition. If the propylene-based resin and the copolymer elastomer are contained in amounts within the above respective ranges, transparency, blocking resistance, and resistance to bag breakage are likely to become favorable.

The amount of the anti-blocking agent to be added with respect to the amount of the polyolefin-based resin composition is preferably not higher than 3000 ppm and more preferably not higher than 2500 ppm. If the amount is set to be not higher than 3000 ppm, the likeliness for the anti-blocking agent to fall off can be decreased.

Descriptions will be given regarding polyolefin-based resins and additives that form a polypropylene-based resin composition of a heat sealing layer in a case where the polyolefin-based resin sealant film in the present invention is composed of a plurality of layers which are two or more layers or three or more layers, e.g., a case where the polyolefin-based resin sealant film is composed of the heat sealing layer and a laminate layer or has a three-layer configuration composed of the heat sealing layer, an intermediate layer, and the laminate layer.

(Polypropylene-Based Resin Composition)

Polyolefin-based resins such as a propylene-ethylene block copolymer and a propylene-α-olefin random copolymer can be contained in the polypropylene-based resin composition that forms the heat sealing layer of the polyolefin-based resin sealant film of the multilayer body in the present invention. In addition, a copolymer elastomer may be added for the purpose of improving impact resistance.

(Propylene-Ethylene Block Copolymer)

A propylene-ethylene block copolymer can be used for the polypropylene-based resin composition that forms the heat sealing layer of the polyolefin-based resin sealant film of the multilayer body in the present invention. The propylene-ethylene block copolymer in the present invention is a copolymer formed through multiple steps including: a first stage of polymerization step of forming a copolymerization component composed of a large amount of propylene and a small amount of ethylene; and a second stage of polymerization step of forming a copolymerization component composed of a small amount of propylene and a large amount of ethylene. Specifically, as described in Japanese Laid-Open Patent Publication No. 2000-186159, a propylene-ethylene block copolymer having been subjected to polymerization through a gas phase process is preferably used. Specifically, examples of the propylene-ethylene block copolymer include block copolymers obtained through: a first step of polymerizing a polymer moiety (component A) containing propylene as a main component, substantially in the absence of an inert solvent; and a second step of polymerizing, in a gas phase, a copolymer moiety (component B) that is composed of propylene and ethylene and that has an ethylene content of 20 to 50 parts by weight. However, the propylene-ethylene block copolymer is not limited thereto.

The melt flow rate (MFR) (measured at 230° C. and under a load of 2.16 kg) of the above propylene-ethylene block copolymer is preferably 1 to 10 g/10 minutes and more preferably 2 to 7 g/10 minutes. If the MFR is not lower than 1 g/10 minutes, extrusion through a T-die is easily performed. Meanwhile, if the MFR is not higher than 10 g/10 minutes, an impact resistance strength (impact strength) is easily increased.

In the present invention, a xylene soluble portion at 20° C. is referred to as CXS, and a xylene insoluble portion at 20° C. is referred to as CXIS. In the propylene-ethylene block copolymer used in the present invention, the CXS contains a rubber component (component B) as a main component, and the CXIS contains a polypropylene component (component A) as a main component. If the limiting viscosities of the CXS and the CXIS are respectively defined as [η]CXS and [η]CXIS, the values of the [η]CXS and the [η]CXIS are as follows. On one hand, the [η]CXS is preferably in a range of 1.8 to 3.8 dl/g and further preferably in a range of 2.0 to 3.1 dl/g. If the [η]CXS is not higher than 3.8 dl/g, fish eyes are unlikely to be generated on the polyolefin-based resin sealant film. Meanwhile, if the [η]CXS is not lower than 1.8 dl/g, the heat sealing strength between the polyolefin-based resin sealant films is unlikely to significantly decrease.

On the other hand, the [η]CXIS is preferably in a range of 1.0 to 3.0 dl/g. If the [η]CXIS is not higher than 3.0 dl/g, extrusion through a T-die is easily performed. Meanwhile, if the [η]CXIS is not lower than 1.0 dl/g, the impact resistance strength (impact strength) of the film is easily increased.

The above [η]CXS and [η]CXIS are values measured according to the following measurement method. A sample of 5 g is completely dissolved in 500 ml of boiling xylene, and then the temperature of the solution is decreased to 20° C., and the solution is left at rest for not shorter than 4 hours. Then, this solution is filtered to be separated into a filtrate and a precipitate, and the limiting viscosities ([η]) of a component (CXS) obtained by drying the filtrate and a solid substance (CXIS) obtained by drying the precipitate under reduced pressure at 70° C. are measured in tetralin at 135° C. by using an Ubbelohde type viscometer.

In general, it is known that a correlation is established between the MFR and the limiting viscosity η of the entire film. With knowledge of the limiting viscosity η of the film, an approximate MFR of the resin used can be known. The limiting viscosity η serves as a rough indication of molecular weight. A larger numerical value of the limiting viscosity η indicates a higher molecular weight, and a smaller numerical value of the limiting viscosity η indicates a lower molecular weight. The MFR serves as a rough indication of molecular weight. A smaller numerical value of the MFR indicates a higher molecular weight, and a larger numerical value of the MFR indicates a lower molecular weight.

The propylene-ethylene block copolymer is such that: the copolymerization proportion of the ethylene component in the propylene-ethylene block copolymer is preferably 1 to 15% by weight and preferably 3 to 10% by weight; and the copolymerization proportion of the propylene component in the propylene-ethylene block copolymer is preferably 85 to 99% by weight and preferably 90 to 97% by weight.

The lower limit of the melting point of the propylene-ethylene block copolymer is not particularly limited, but is preferably 120° C. and more preferably 125° C. If the melting point is not lower than 120° C., heat resistance is easily obtained, and inner surfaces of the bag are unlikely to be fused to each other at the time of retorting treatment. The upper limit of the melting point of the propylene-ethylene block copolymer is not particularly limited, but is preferably 175° C. and more preferably 170° C. If the melting point is not higher than 175° C., the heat sealing temperature is likely to decrease.

Specific examples of the propylene-ethylene block copolymer include: a block copolymerized polypropylene resin (WFS5293-22 manufactured by Sumitomo Chemical Co., Ltd., and having an MFR, at 230° C. and under a load of 2.16 kg, of 3.0 g/10 minutes and a melting point of 164° C.) in which the ethylene content is 7% by weight and the limiting viscosity η of the CXS is 3.0 dl/g; and a block copolymerized polypropylene resin (WFS5293-29 manufactured by Sumitomo Chemical Co., Ltd., and having an MFR, at 230° C. and under a load of 2.16 kg, of 3.0 g/10 minutes and a melting point of 164° C.) in which the ethylene content is 6% by weight and the limiting viscosity η of the CXS is 2.3 dl/g.

(Propylene-α-Olefin Random Copolymer)

An object of the present invention is to decrease the heat sealing temperature of the heat sealing layer of the polyolefin-based resin sealant film. To this end, a propylene-α-olefin random copolymer is preferably added.

Examples of the propylene-α-olefin random copolymer can include a copolymer of: propylene; and at least one type of α-olefin having 2 to 20 carbon atoms, other than propylene. As such an α-olefin monomer having 2 to 20 carbon atoms, ethylene, butene-1, pentene-1, 4-methylpentene-1, hexene-1, octene-1, or the like can be used. Without any particular limitation, ethylene is preferably used as the α-olefin monomer from the viewpoint of compatibility with the propylene-ethylene block copolymer. Two or more types of propylene-α-olefin random copolymers can be mixed and used as necessary. A propylene-ethylene random copolymer is particularly preferable. In this document, when it comes to naming, monomers forming a random copolymer are described in an order starting from the monomer having the highest compositional proportion.

The lower limit of the melt flow rate (MFR), at 230° C. and under a load of 2.16 kg, of the propylene-α-olefin random copolymer is preferably 0.6 g/10 minutes, more preferably 1.0 g/10 minutes, and further preferably 1.2 g/10 minutes. If the MFR is not lower than 0.6 g/10 minutes, compatibility with the propylene-ethylene block copolymer is increased, and the film is unlikely to be whitened. The upper limit of the melt flow rate of the propylene-α-olefin random copolymer is preferably 10.0 g/10 minutes, more preferably 8.0 g/10 minutes, and further preferably 7.0 g/10 minutes.

In addition, the copolymerization proportion of the α-olefin component in the propylene-α-olefin random copolymer is preferably 1 to 15% by weight and preferably 3 to 10% by weight. The copolymerization proportion of the propylene component in the propylene-ethylene random copolymer is preferably 85 to 99% by weight and preferably 90 to 97% by weight.

The lower limit of the melting point of the propylene-α-olefin random copolymer is preferably 120° C. and more preferably 125° C. If the melting point is not higher than 120° C., the inner surfaces of the bag might be fused to each other at the time of retorting treatment. The upper limit of the melting point of the propylene-α-olefin random copolymer is preferably 160° C., more preferably 150° C., and further preferably 145° C. If the melting point is not higher than 160° C., the heat sealing temperature is likely to decrease.

At least one of the propylene-α-olefin random copolymers preferably has a low melting point. If a propylene-α-olefin random copolymer having a low melting point is contained, low-temperature sealability becomes favorable.

The lower limit of the melting point of the at least one type of propylene-α-olefin random copolymer is preferably 120° C. and more preferably 125° C. If the melting point is not lower than 120° C., the inner surfaces of the bag are unlikely to be fused to each other at the time of retorting treatment. Regarding the upper limit of the melting point of the at least one type of propylene-α-olefin random copolymer, the melting point is preferably lower than 140° C. and more preferably lower than 137° C. If the melting point is lower than 140° C., the heat sealing temperature is likely to decrease.

The lower limit of the melting point of at least one type of propylene-α-olefin random copolymer among the propylene-α-olefin random copolymers is preferably 140° C. If the melting point is not lower than 140° C., the bag is unlikely to shrink at the time of retorting treatment. Regarding the upper limit of the melting point of the at least one type of propylene-α-olefin random copolymer, the melting point is preferably not higher than 160° C. and more preferably not higher than 150° C. If the melting point is lower than 140° C., the heat sealing temperature is likely to decrease.

Specific examples of the propylene-α-olefin random copolymer include: S131 (manufactured with a Ziegler-Natta catalyst and having an ethylene content of 5.5% by weight, a density of 890 kg/m$^3$, an MFR, at 230° C. and under a load of 2.16 kg, of 1.5 g/10 minutes, and a melting point of 132° C.) manufactured by Sumitomo Chemical Co., Ltd.; a propylene-ethylene random copolymer WFW4M (manufactured with a metallocene catalyst and having an ethylene content of 7% by weight, a density of 900 kg/m$^3$, an MFR, at 230° C. and under a load of 2.16 kg, of 7.0 g/10 minutes, and a melting point of 136° C.) manufactured by Japan Polypropylene Corporation; and the like.

A propylene homopolymer containing a metallocene-based olefin polymerization catalyst is characterized by, as compared with a propylene homopolymer containing a Ziegler-Natta-based olefin polymerization catalyst, having a narrower molecular weight distribution and containing smaller amounts of components on the low molecular weight side relative to a weight-average molecular weight serving as a reference and smaller amounts of components on the high molecular weight side relative to the weight-average molecular weight. It has also been newly found that generation of whiskers is inhibited if the propylene homopolymer containing the metallocene-based olefin polymerization catalyst is used. Further, excellent flexibility and excellent strength are obtained.

Here, the metallocene-based olefin polymerization catalyst refers to a catalyst composed of: a (i) transition metal compound (so-called metallocene compound) in group 4 of the periodic table including a ligand having a cyclopentadienyl backbone; a (ii) co-catalyst that reacts with the metallocene compound to be able to achieve activation to a stable ionic state; and, as necessary, an (iii) organic aluminum compound. Any of known catalysts can be used.

(Copolymer Elastomer)

A thermoplastic copolymer elastomer containing a polyolefin as a main component may be added to the polypropylene-based resin composition that forms the heat sealing layer of the sealant film of the multilayer body in the present invention for the purpose of improving the resistance, to bag breakage resulting from falling, of a packaging bag obtained by using the films in the present invention.

Regarding the copolymer elastomer in the present invention, as an olefin-based thermoplastic copolymer elastomer that exhibits rubber-like elasticity at around normal temperature, there is an ethylene-butene copolymer elastomer which is an amorphous or low-crystallinity elastomer obtained by copolymerizing ethylene and butene.

As an olefin-based thermoplastic copolymer elastomer that exhibits comparatively high Shore hardness and favorable transparency among elastomers, there is a propylene-butene copolymer elastomer which is a crystalline elastomer obtained by copolymerizing propylene and butene.

A desirable mode involves use of an ethylene-butene copolymer elastomer and an ethylene-propylene copolymer elastomer each having: a melt flow rate (MFR), at 230° C. and under a load of 2.16 kg, of 0.2 to 5.0 g/10 minutes; a density of 820 to 930 kg/m$^3$; and a molecular weight distribution (Mw/Mn), obtained through the GPC method, of 1.3 to 6.0. If the melt flow rate (MFR) under a load of 2.16 kg is lower than 0.2 g/10 minutes, evenness in kneading becomes insufficient, and fish eyes become likely to be generated. Meanwhile, a melt flow rate (MFR) higher than 5.0 g/10 minutes is not preferable from the viewpoint of resistance to bag breakage.

In the present invention, the limiting viscosity [η] of each of the ethylene-propylene copolymer elastomer, the propylene-butene copolymer elastomer, and the ethylene-butene copolymer elastomer is preferably 1.0 to 5.0 and suitably 1.2 to 3.0 from the viewpoint of maintaining heat sealing strength, maintaining impact strength, and bag strength against dropping. If the limiting viscosity [η] is lower than 1.0, evenness in kneading becomes insufficient, and fish eyes become likely to be generated. Meanwhile, a limiting viscosity [η] higher than 5.0 is not preferable from the viewpoint of resistance to bag breakage and heat sealing strength.

Specifically, the copolymer elastomer can be exemplified by: an ethylene-butene copolymer elastomer (TAFMERA1085S manufactured by Mitsui Chemicals, Inc.) having a density of 885 kg/m$^3$ and an MFR (at 230° C. and under 2.16 kg) of 1.4 g/10 minutes; a propylene-butene copolymer elastomer (TAFMER XM7070 manufactured by Mitsui Chemicals, Inc.) having a density of 900 kg/m$^3$ and an MFR (at 230° C. and under 2.16 kg) of 3 g/10 minutes; an ethylene-propylene copolymer elastomer (TAFMER P0480 manufactured by Mitsui Chemicals, Inc.) having a density of 870 kg/m$^3$ and an MFR (at 230° C. and under 2.16 kg) of 1.8 g/10 minutes; and the like.

(Additives)

The polypropylene-based resin composition that forms the heat sealing layer of the sealant film of the multilayer body in the present invention may contain an anti-blocking agent. The anti-blocking agent may be one type of anti-blocking agent. However, if two or more types of inorganic particles having different particle diameters and shapes are blended, more complicated protrusions are formed also on an uneven portion of the surface of the film, whereby a higher level of blocking prevention effect can be obtained.

The anti-blocking agent to be added is not particularly limited, and it is possible to add: inorganic particles of spherical silica, silica in infinite form, zeolite, talc, mica, alumina, hydrotalcite, aluminum borate, or the like; or organic particles of polymethyl methacrylate, ultrahigh-molecular-weight polyethylene, or the like.

The amount of the anti-blocking agent to be added with respect to the amount of the polyolefin-based resin composition that forms the heat sealing layer is preferably not higher than 3000 ppm and more preferably not higher than 2500 ppm. If the amount is set to be not higher than 3000 ppm, the likeliness for the anti-blocking agent to fall off can be decreased.

An organic lubricant may be added to the polyolefin-based resin composition that forms the heat sealing layer of the sealant film of the multilayer body in the present invention. By doing so, slippage and the blocking prevention effect of the multilayer film are improved, and the handleability of the film is improved. The reason for this is considered to be because the organic lubricant bleeds out to be present on the surface of the film so that a lubricating effect and a release effect are exhibited.

As the organic lubricant, one that has a melting point of not lower than normal temperature is preferably added. Examples of the organic lubricant include fatty acid amides and fatty acid esters.

Specifically, the organic lubricant is oleic acid amide, erucic acid amide, behenic acid amide, ethylene bis-oleic acid amide, hexamethylene bis-oleic acid amide, ethylene bis-oleic acid amide, or the like. Although these organic lubricants may be used singly, two or more types of organic lubricants may be used in combination. Doing so enables slippage and the blocking prevention effect to be maintained even in a harsh environment, and thus is preferable.

In the polyolefin-based resin composition that forms the sealing layer of the sealant film of the multilayer body in the present invention, an appropriate amount of an antioxidant, an antistatic agent, an antifogging agent, a neutralizer, a nucleating agent, a colorant, another additive, an inorganic filler, or the like can be blended, as necessary, in an arbitrarily-selected layer as long as the object of the present invention is not impaired by doing so.

Examples of the manner of using the antioxidant include: a manner in which a phenol-based antioxidant and a phosphite-based antioxidant are used in combination; and a manner in which an antioxidant having a phenol-based backbone and a phosphite-based backbone in one molecule thereof is singly used. Examples of the neutralizer include calcium stearate and the like.

(Polyolefin-Based Resin Composition)

The polypropylene-based resin composition that forms the heat sealing layer of the sealant film of the multilayer body in the present invention contains a propylene-α-olefin random copolymer. It is preferable that the polyolefin-based resin composition contains: a propylene-α-olefin random copolymer; and one or more types of elastomers selected from the group consisting of an ethylene-propylene copolymer elastomer, a propylene-butene copolymer elastomer, and an ethylene-butene copolymer elastomer.

It is more preferable that the polyolefin-based resin composition contains a propylene-α-olefin random copolymer having a melting point of not lower than 120° C. and lower than 140° C., in an amount of not lower than 10 parts by weight and not higher than 40 parts by weight with respect to the total amount (100 parts by weight) of polyolefin-based resins that form the polyolefin-based resin composition.

It is further preferable that a copolymer selected from the group consisting of a propylene-ethylene block copolymer and a propylene-α-olefin random copolymer having a melting point of not lower than 140° C. is contained in an amount of not lower than 40 parts by weight and not higher than 85 parts by weight with respect to the total amount (100 parts by weight) of the polyolefin-based resins that form the polypropylene-based resin composition.

In addition, the polyolefin-based resin composition contains at least one type of copolymer elastomer selected from an ethylene-propylene copolymer elastomer, an ethylene-butene copolymer elastomer, and a propylene-butene copolymer elastomer, in an amount of preferably 5 to 20 parts by weight and more preferably not lower than 6 parts by weight and not higher than 15 parts by weight with respect to the total amount (100 parts by weight) of the polyolefin-based resins that form the polyolefin-based resin composition. If the propylene-based resin and the copolymer elastomer are contained in amounts within the above respective ranges, transparency, blocking resistance, and resistance to bag breakage are likely to become favorable.

In a polyolefin-based resin composition that forms the laminate layer or each of the intermediate layer and the laminate layer of the polyolefin-based resin sealant film in the present invention, the mixing ratio of the propylene-ethylene block copolymer, the propylene-α-olefin random copolymer, the ethylene-propylene copolymer elastomer, the propylene-butene copolymer elastomer, the ethylene-butene copolymer elastomer, and a styrene-based copolymer elastomer may be equal to that in the heat sealing layer. However, if the mixing ratio is set to differ between the layers, balance among properties such as tear properties, heat sealing strength, and resistance to bag breakage can be adjusted.

In the case of a multilayer configuration composed of two layers or three or more layers, the anti-blocking agent may be added to all the layers. However, since presence of projections and recesses on the surface of the layer to be laminated with a biaxially oriented film might result in poor appearance at the time of lamination processing, the anti-blocking agent is preferably added only to layers at which the films are adhered to each other through heat sealing.

(Polyolefin-Based Resin Sealant Film)

The polyolefin-based resin sealant film in the present invention may be composed of a single layer or multiple layers which are two layers or three or more layers. In the case of a three-layer configuration, if pellets obtained by recycling a semi-finished product generated in the course of a production process or a post-production product film are added to the intermediate layer, cost is reduced without impairing heat sealing strength and bag breakage properties. Moreover, the advantageous effect of the polyolefin-based resin sealant film can be further improved if resins having slightly different compositions are used for the respective layers as in a case where, for example: a propylene-α-olefin random copolymer having a low melting point is added only to the sealing layer; and the intermediate layer and the laminate layer are each used in a state of containing, as a main component, a propylene-α-olefin random copolymer having a high melting point.

(Production Method for Polyolefin-Based Resin Sealant Film)

The production method for the base material film used for the multilayer body in the present invention is not particularly limited, and a known method can be selected. Examples of the production method include an inflation method, a sequential biaxial stretching method, a simultaneous biaxial stretching method, and the like. In the inflation method, an orientation axis is tilted during stretching from the time of blowing to the time of cooling. In the sequential biaxial stretching method and the simultaneous biaxial stretching method, an orientation axis is tilted during stretching with a tenter such that: the tilt of the orientation axis is small at the center of the production equipment; and meanwhile, the tilt is larger at a location closer to an end of the production equipment.

As a method for molding the sealant film of the multilayer body in the present invention, an inflation method or a T-die method can be used, for example. Out of these methods, the T-die method is preferable from the viewpoint of increasing transparency and ease of performing drafting. In the inflation method, a cooling medium is air, whereas, in the T-die method, a cooling roll is used as a cooling medium. Thus, the T-die method is a production method that is advantageous in increasing the cooling speed. Increase in the cooling speed enables suppression of crystallization in an unstretched sheet, and thus is advantageous in stretching using a roll in a subsequent step. For this reason, the T-die method is preferable.

The lower limit of the temperature of the cooling roll when the raw material resins having been melted are cast thereon to obtain a non-oriented sheet, is preferably 15° C. and more preferably 20° C. If the temperature is lower than the above lower limit, dewing might occur on the cooling roll, resulting in insufficient adhesion. The upper limit of the temperature of the cooling roll is preferably 60° C. and more preferably 50° C. If the temperature is higher than the above upper limit, transparency might deteriorate.

The method for stretching the non-oriented sheet is not particularly limited, and it is possible to employ, for example, an inflation method, a tenter transverse stretching method, or a roll longitudinal stretching method. Among the methods, the roll longitudinal stretching method is preferable from the viewpoint of ease of orientation control.

The longitudinal stretching mentioned here means stretching in a direction (longitudinal direction) in which a film flows from a step of casting the raw material resin compositions to a step of winding a stretched film. A lateral direction means a direction (width direction) perpendicular to the flow direction.

By stretching the non-oriented sheet, straight cuttability is exhibited. This is because the structures of molecular chains are regularly arrayed in the stretching direction.

The lower limit of a stretch ratio is preferably 3.0-fold. If the stretch ratio is lower than this lower limit, the yield strength decreases, and the tear strength might increase or inferiority in straight cuttability might result. The lower limit is more preferably 3.3-fold and further preferably 3.5-fold.

The upper limit of the stretch ratio is preferably 4.8-fold. If the stretch ratio is higher than this upper limit, orientation excessively progresses, and the heat sealing strength decreases, whereby the resistance to bag breakage resulting from dropping might deteriorate. The upper limit is more preferably 4.5-fold and further preferably 3.8-fold.

The lower limit of the temperature of a stretching roll is not particularly limited, but is preferably 80° C. If the temperature is lower than this lower limit, the stretching stress to be applied to the film increases, whereby the thickness of the film might fluctuate. The lower limit is more preferably 90° C.

The upper limit of the temperature of the stretching roll is not particularly limited, but is preferably 140° C. If the temperature is higher than this upper limit, the stretching stress to be applied to the film decreases. This decrease might lead not only to decrease in the tear strength of the film but also to fusion of the film to the stretching roll so that it might become difficult to perform production. The upper limit is more preferably 130° C., further preferably 125° C., and particularly preferably 115° C.

It is preferable to, before subjecting an unstretched sheet to a stretching step, bring the unstretched sheet into contact with a preheating roll so as to increase the temperature of the sheet. The lower limit of the temperature of the preheating roll when the non-oriented sheet is stretched is not particularly limited, but is preferably 80° C. and more preferably 90° C. If the temperature is lower than the above lower limit, the stretching stress increases, whereby the thickness might fluctuate. The upper limit of the temperature of the preheating roll is not particularly limited, but is preferably 140° C., more preferably 130° C., and further preferably 125° C. If the temperature is not lower than the above upper limit, the heat shrinkage rate and the retort shrinkage rate might increase. This is because, if the preheating temperature is low, pre-stretching thermal crystallization can be suppressed and post-stretching residual stress can be decreased.

Annealing treatment is preferably performed on the polyolefin-based resin sealant film having been subjected to a longitudinal stretching step in order to inhibit thermal shrinkage. Annealing treatment methods include a roll heating method, a tenter method, and the like. Among these methods, the roll heating method is preferable from the viewpoint of simplicity of equipment and ease of maintenance. By performing annealing treatment, the internal stress of the film is decreased. Consequently, the thermal shrinkage of the film can be suppressed, but adverse influence might be inflicted on characteristics other than the heat shrinkage rate.

The lower limit of the temperature for annealing treatment is not particularly limited, but is preferably 80° C. If the temperature is lower than the above lower limit, the heat shrinkage rate might increase, the tear strength might increase, or the finish of a packaging bag after bag production or retorting might deteriorate. The lower limit is more preferably 100° C. and particularly preferably 110° C. The upper limit of the temperature for annealing treatment is preferably 140° C. A higher temperature for annealing treatment makes it more likely for the heat shrinkage rate to decrease. However, if the temperature is not higher than 140° C., unevenness in the thickness of the film is unlikely to occur, the film is unlikely to be fused to the production equipment, and transparency, sealability, and resistance to bag breakage are unlikely to decrease. The upper limit is more preferably 135° C. and particularly preferably 130° C.

An annealing step can be provided with a relaxation step by, for example, sequentially decreasing the conveying speed for the film through decrease of a roll rotation speed or the like. By providing the relaxation step, the heat shrinkage rate of the polyolefin-based resin sealant film having been produced can be decreased.

The upper limit of the relaxation rate in the relaxation step is preferably 10% and more preferably 8%. If the relaxation rate is not higher than 10%, the film being conveyed is unlikely to sag and is unlikely to be wound during the step. The lower limit of the relaxation rate is preferably 1% and more preferably 3%. If the relaxation rate is not lower than 1%, the heat shrinkage rate of the polyolefin-based resin sealant film is unlikely to increase.

In the polyolefin-based resin sealant film in the present invention, the lamination surface of the polyolefin-based resin sealant film described above is preferably subjected to corona treatment or the like to make the surface active. By this treatment, the lamination strength with respect to the base material film is improved. The lamination surface is provided on the side opposite to the heat sealing surface.

Characteristics of the polyolefin-based resin sealant film of the multilayer body in the present invention will be described.

(Film Thickness)

The lower limit of the thickness of the polyolefin-based resin sealant film of the multilayer body in the present invention is preferably 20 μm, more preferably 30 μm, further preferably 40 μm, and particularly preferably 50 μm. If the thickness is not smaller than 20 μm, the thickness is large relative to the thickness of the base material film. Consequently, the straight cuttability of the multilayer body is unlikely to deteriorate, the film becomes stiff and becomes easy to machine, and moreover, impact resistance is easily obtained so that resistance to bag breakage is easily obtained. The upper limit of the film thickness is preferably 150 μm, more preferably 100 μm, and further preferably 80 μm. If the film thickness is not larger than 150 μm, the film is prevented from having an excessively high stiffness and becomes easy to machine, and moreover, a suitable package is easily produced.

(Haze)

The lower limit of the haze of the polyolefin-based resin sealant film of the multilayer body in the present invention is preferably 3.0% and more preferably 8.0%. If the haze is not lower than 3.0%, the film is not in a state of having an extremely small number of projections and recesses on a surface thereof, and thus inner surface blocking of the package is unlikely to occur. The upper limit of the haze is preferably 60.0%, more preferably 55.0%, and further preferably 50.0%. If the haze is not higher than 60.0%, visibility through the package is easily obtained.

(Heat Shrinkage Rate)

The upper limit of a heat shrinkage rate at 120° C. in a direction in which the heat shrinkage rate is higher out of the longitudinal direction and the width direction of the polyolefin-based resin sealant film of the multilayer body in the present invention, is 25%. If the heat shrinkage rate is not higher than 25%, the shrinkage upon retorting of the package or upon heat sealing decreases, and the appearance of the package is unlikely to be impaired. The upper limit is preferably 20% and further preferably 15%.

The lower limit of the heat shrinkage rate in a direction in which the heat shrinkage rate is higher out of the longitudinal direction and the width direction of the sealant film of the multilayer body in the present invention, is 1%. If the heat shrinkage rate is not lower than 1%, it is unnecessary to significantly increase the annealing temperature or the annealing time, and thus the appearance is unlikely to deteriorate.

The upper limit of the tear strength in the longitudinal direction of the polyolefin-based resin sealant film of the multilayer body in the present invention is preferably 500 mN. A tear strength higher than this upper limit makes it difficult to tear the laminate film. The upper limit is more preferably 400 mN and further preferably 300 mN. The lower limit of the tear strength in the longitudinal direction of the polyolefin resin sealant film in the present invention is preferably 80 mN. If the tear strength is lower than this lower limit, the resistance to bag breakage might deteriorate. The lower limit is more preferably 150 mN.

(Piercing Strength)

The lower limit of the piercing strength of the polyolefin-based resin film of the multilayer body in the present invention is preferably 5.0 N and more preferably 6.0 N. If the piercing strength is lower than the above lower limit, a pinhole might be generated when a protrusion comes into contact with the package. The upper limit of the piercing strength is preferably 10.0 N, more preferably 12.0 N, and further preferably 10.0 N. If the piercing strength is higher than the above upper limit, the stiffness becomes excessively high, and it might become difficult to perform handling at the time of forming a film or a multilayer body.

The lower limit of the piercing strength, per micrometre, of the polyolefin-based resin sealant film in the present invention is preferably 0.05 N/μm and more preferably 0.10 N/μm. If the piercing strength is not lower than 0.05 N/μm, a pinhole is unlikely to be generated when a protrusion comes into contact with the package. The upper limit of the piercing strength is preferably 1.00 N/μm, more preferably 0.80 N/μm, and further preferably 0.50 N/μm. If the piercing strength is not higher than 1.00 N/μm, the stiffness is prevented from becoming excessively high, and it becomes easy to perform handling at the time of forming a film or a multilayer body.

(Wetting Tension)

The lower limit of the wetting tension of the surface of the laminate layer in the polyolefin-based resin sealant film of the multilayer body in the present invention is preferably 32 mN/m and more preferably 35 mN/m. If the wetting tension is not lower than 32 mN/m, the lamination strength is unlikely to decrease. The upper limit of the wetting tension is preferably 55 mN/m and more preferably 50 mN/m. If the wetting tension is not higher than 55 mN/m, blocking between films is unlikely to occur when the polyolefin-based resin sealant film is wound around a roll.

(Orientation Coefficient in Longitudinal Direction)

An orientation coefficient ΔNx in the longitudinal direction of the polyolefin-based resin sealant film in the present invention can be calculated according to expression 1.

$$\Delta Nx = Nx - (Ny + Nz)/2 \qquad \text{(expression 1)}$$

Nx: refractive index in longitudinal direction
Ny: refractive index in direction perpendicular to longitudinal direction and thickness direction
Nz: refractive index in thickness direction The lower limit of the orientation coefficient ΔNx in the longitudinal direction of the sealant film used in the present invention is preferably 0.0150, more preferably 0.0180, and further preferably 0.0200. If the orientation coefficient ΔNx is not smaller than 0.0150, straight cuttability of the package is easily obtained. The upper limit of the orientation coefficient ΔNx in the longitudinal direction is preferably 0.0230 and more preferably 0.0220. If the orientation coefficient ΔNx is not larger than 0.0230, sealing strength is unlikely to decrease.

(Plane Orientation Coefficient)

A plane orientation coefficient ΔP of the polyolefin-based resin sealant film in the present invention can be calculated according to refractive indexes. The orientation coefficient in a planar direction can be calculated according to expression 2.

$$\Delta P = (Nx + Ny)/2 - Nz \qquad \text{(expression 2)}$$

Nx: refractive index in longitudinal direction
Ny: refractive index in direction perpendicular to longitudinal direction and thickness direction
Nz: refractive index in thickness direction The lower limit of the orientation coefficient ΔP in the planar direction of the polyolefin-based resin sealant film in the present invention is preferably 0.0080 and more preferably 0.0100. If the orientation coefficient ΔP is not smaller than 0.0080, the piercing strength of the package is easily obtained. The upper limit of the plane orientation coefficient ΔP is preferably 0.0130 and more preferably 0.0125. If the orientation coefficient ΔP is not larger than 0.0130, sealing strength is unlikely to decrease.

(Configuration of, and Production Method for, Multilayer Body)

The multilayer body in the present invention is a multilayer body including one or more types of films selected from the group consisting of a polyamide resin-based film, a polyester-based resin film, and a polypropylene-based resin film. It is also possible to employ a configuration in which, for example, films obtained by performing coating or vapor deposition treatment on these base material films through known technologies for the purpose of imparting adhesiveness and barrier properties are used, or an aluminum foil is further stacked thereon.

Specifically, examples of the multilayer body include multilayer bodies of a biaxially stretched polypropylene film/the sealant film, the biaxially stretched polyethylene terephthalate film/the sealant film, the biaxially stretched polyethylene terephthalate film/the aluminum foil/the sealant film, the biaxially stretched nylon 6 film/the sealant film, the biaxially stretched polyethylene terephthalate film/the biaxially stretched nylon 6 film/the sealant film, the biaxially stretched polyethylene terephthalate film/the aluminum foil/the biaxially stretched nylon 6 film/the sealant film, the biaxially stretched polyethylene terephthalate film/the biaxially stretched nylon 6 film/the aluminum foil/the sealant film, the biaxially stretched nylon 66 film/the sealant film, the biaxially stretched polyethylene terephthalate film/the biaxially stretched nylon 66 film/the sealant film, the biaxially stretched polyethylene terephthalate film/the aluminum foil/the biaxially stretched nylon 66 film/the sealant film, the biaxially stretched polyethylene terephthalate film/the biaxially stretched nylon 66 film/the aluminum foil/the sealant film, and the like.

An adhesion layer may be provided between the aluminum foil and each of the polyamide resin-based film, the polyester-based resin film, and the polypropylene-based resin film.

Regarding a multilayer body including the biaxially stretched nylon 6 film or the biaxially stretched nylon 66 film among these multilayer bodies, the straight cuttability of the multilayer body significantly deteriorates in the case of using a conventional sealant.

However, if the polyolefin-based resin sealant film used in the present invention is used as a sealant, a multilayer body having favorable straight cuttability can be produced with any of the configurations.

As a lamination method, known methods such as a dry lamination method and an extrusion lamination method can be employed, and any of the lamination methods makes it possible to produce a multilayer body having favorable straight cuttability.

Characteristics of the multilayer body will be described.
(Straight Cuttability)

The upper limit of the straight cuttability of the multilayer body in the present invention is preferably 10 mm, more preferably 9 mm, further preferably 7 mm, and particularly preferably 3 mm. If the straight cuttability is not larger than 10 mm, the package is unlikely to suffer parting.
(Retort Shrinkage Rate)

The upper limit of the retort shrinkage rate in the longitudinal direction of the multilayer body in the present invention is preferably 5%. If the retort shrinkage rate is higher than this upper limit, the appearance of a post-retorting package might deteriorate. The upper limit is more preferably 4% and further preferably 2.1%. The lower limit of the retort shrinkage rate in the longitudinal direction is −2%. A retort shrinkage rate lower than this lower limit leads to a high post-retorting elongation and might cause bag breakage. The lower limit is more preferably 0%.

The upper limit of the retort shrinkage rate in the width direction of the multilayer body in the present invention is preferably 5%. If the retort shrinkage rate is higher than this upper limit, the appearance of a post-retorting package might deteriorate. The upper limit is more preferably 4% and further preferably 2.1%. The lower limit of the retort shrinkage rate in the width direction is −2%. A retort shrinkage rate lower than this lower limit leads to a high post-retorting elongation and might cause bag breakage. The lower limit is more preferably 0%.
(Piercing Strength)

The lower limit of the pre-retorting piercing strength of the multilayer body in the present invention is preferably 10.0 N, more preferably 12.0 N, further preferably 15.0 N, and even more preferably 20.0 N. If the pre-retorting piercing strength is not lower than 10.0 N, a pinhole is unlikely to be generated when a protrusion comes into contact with the package. The upper limit of the piercing strength is preferably 45.0 N, more preferably 30.0 N, and further preferably 25.0 N. If the piercing strength is not higher than 45.0 N, the stiffness of the multilayer body is prevented from becoming excessively high, and it becomes easy to perform handling.
(Tear Strength)

The upper limit of the tear strength in the longitudinal direction of the multilayer body in the present invention is preferably 1000 mN. If the tear strength is not higher than 1000 mN, it becomes easy to tear the multilayer body. The upper limit is more preferably 800 N, further preferably 600 mN, and even more preferably 400 mN.

The lower limit of the tear strength in the longitudinal direction of the multilayer body in the present invention is preferably 100 mN. If the tear strength is not lower than 100 mN, a step is easily formed when the package is opened by being torn. The lower limit is more preferably 150 mN.
(Heat-Sealing Start Temperature)

Regarding the upper limit of a pre-retorting heat-sealing start temperature of the multilayer body in the present invention, the heat-sealing start temperature is preferably not higher than 195° C., more preferably not higher than 190° C., and further preferably not higher than 188° C. If the pre-retorting heat-sealing start temperature is higher than 190° C., high temperature is necessary for bag production. Consequently, the shrinkage of the film increases, and the appearance might be impaired. Regarding the lower limit of the heat sealing temperature, the heat sealing temperature is preferably not lower than 150° C. and further preferably not lower than 160° C. If the heat sealing temperature is lower than the above lower limit, inner surfaces of the film might be fused to each other owing to heat in retorting treatment.
(Heat Sealing Strength)

The lower limit of the pre-retorting heat sealing strength of the multilayer body in the present invention is preferably 35 N/15 mm, more preferably 40 N/15 mm, and further preferably 46 N/15 mm. If the pre-retorting heat sealing strength is not lower than 35 N/15 mm, resistance to bag breakage is easily obtained. 60 N/15 mm is enough for the heat sealing strength.
(Package)

The multilayer body shaped so as to surround contents such as food stuff for the purpose of protecting the contents from dust, gas, or the like in nature, is referred to as a package. The package is produced by, for example: cutting out portions from the multilayer body; adhering inner surfaces thereof to each other through a heated heat sealing bar, ultrasonic waves, or the like; and causing the resultant product to be made into the shape of a bag. An example of a widely-used package is a four-side sealed bag obtained by: superposing two multilayer bodies having rectangular shapes such that the sealant sides thereof face inward; and heat-sealing the four sides. The contents may be food stuff or may be, for example, other products such as daily necessities. The shape of the package may be a shape other than a rectangular shape, such as the shape of a standing pouch or a pillow package.

A package that can withstand heat in heating sterilization using hot water having been subjected to compression or the like such that the temperature thereof is increased to the boiling point, i.e., increased to be not lower than 100° C., is referred to as a package for use in retorting. A film intended to provide the package is referred to as a film for use in retorting.
(Distance between Opening Ends)

The upper limit of the distance between opening ends of the package in the present invention is preferably 10.0 mm, preferably 5.0 mm, and more preferably 3.0 mm. If the distance is not longer than 10.0 mm, the resistance and the extent of parting at the time of opening by tearing are low and small. The lower limit of the distance between the opening ends of the package in the present invention is preferably 1.5 mm and more preferably 2.0 mm. If the distance is set to be not shorter than 1.0 mm, it becomes easy to hook a finger at one of the opening ends, and thus the openability is favorable.

(Extent of Parting)

The upper limit of the extent of parting of the package in the present invention is preferably 10 mm, more preferably 8 mm, and further preferably 5 mm. If the extent of parting is not larger than 10 mm, contents are unlikely to spill when the package is torn.

(Bag-Production Finish)

If the films suffer thermal shrinkage during a step of producing a package while heat-sealing the multilayer bodies, the thermally shrunk portion might become a wrinkle, or a dimension defect of the package might occur. In a finished state when a four-side sealed bag is produced, it is preferable that a sealed portion is not wrinkled, and it is more preferable that there is no waviness at the sealed portion. If the sealed portion is wrinkled, the appearance of the package might be impaired.

Good: There is no distortion near a heat-sealed portion, with the bag having a complete rectangular shape.

Poor: There is a small extent of distortion near the heat-sealed portion.

Bad: There is a large extent of distortion near the heat-sealed portion, with an edge of the bag becoming wavy.

(Openability)

An openability in a case where an opening is formed with fingers from a tear-opening end of the package in the present invention is preferably such that the package can easily be opened by hooking a finger between opening ends on the front side and the back side. Evaluations were performed on the basis of the following criteria.

Good: An opening can be formed by naturally hooking a finger at an opening end.

Poor: An opening can be formed by inserting a fingernail in the opening end.

Bad: A fingernail cannot be inserted in the opening end.

EXAMPLES

Hereinafter, the present invention will be described in detail by means of examples, but is not limited to these examples. Characteristics obtained in each example were measured and evaluated through the following methods. In the evaluation, a flow direction in which the film flows during a film production step was defined as a longitudinal direction, and a direction perpendicular to the flow direction was defined as a width direction.

(1) Resin Density

The density was evaluated according to method D (density-gradient tube method) in JIS K 7112: 1999. Measurement was performed with N being 3, and an average value was calculated.

(2) Melt Flow Rate (MFR)

Measurement was performed at 230° C. and under a load of 2.16 kg on the basis of JIS K 7210-1. Measurement was performed with N being 3, and an average value was calculated.

(3) Haze

The haze was measured on the basis of JIS K 7136. A pre-lamination polyolefin-based resin sealant film was measured with N being 3, and an average value was calculated.

(4) Heat Shrinkage Rate

A sample having four sides each measuring 120 mm was cut out from a pre-lamination film. Reference lines were drawn at an interval of 100 mm in each of the MD direction and the TD direction. The sample was hung in an oven having a temperature kept at 120° C. and was heated for 30 minutes. The distance between the reference lines was measured, and the heat shrinkage rate was calculated according to the following expression 3. Measurement was performed with N being 3, and an average value was calculated.

$$\text{Heat shrinkage rate} = (\text{pre-heating reference line length} - \text{post-heating reference line length}) / \text{pre-heating reference line length} \times 100(\%) \quad \text{(expression 3)}$$

(5) Tear Strength

The tear strength was measured according to JIS K 7128-1: 1998. Evaluation was performed on each of a pre-lamination polyolefin-based resin sealant film and a multilayer body. Measurement was performed in each of the longitudinal direction and the width direction with N being 3, and an average value was calculated.

(6) Piercing Strength

The piercing strengths of a polyolefin-based resin sealant film and a multilayer body were measured at 23° C. according to "2. Testing methods for strength, etc." in "Standards for food, additives, etc., Chapter III: Apparatus and Containers and Packaging" (Notification No. 20 of the Ministry of Health and Welfare, 1982) of the Food Sanitation Act. The film was pierced with a needle having a tip diameter of 0.7 mm at a piercing speed of 50 mm/minute, and the strength at which the needle penetrated the film was measured. Measurement was performed with N being 3, and an average value was calculated. The obtained measurement value was divided by the thickness of the film, and a piercing strength [N/μm] per micrometre of the film was calculated.

(7) Orientation Coefficient in Longitudinal Direction and Plane Orientation Coefficient The refractive index was evaluated according to Test methods for refractive index of chemical products of JIS K 0062: 1999.

Measurement was performed with N being 3, and an average value was calculated. The orientation coefficient ΔNx in the longitudinal direction and the plane orientation coefficient ΔP were calculated according to expression 1 and expression 2.

$$\Delta Nx = Nx - (Ny + Nz)/2 \quad \text{(expression 1)}$$

$$\Delta P = (Nx + Ny)/2 - Nz \quad \text{(expression 2)}$$

Nx: refractive index in longitudinal direction

Ny: refractive index in direction perpendicular to longitudinal direction and thickness direction Nz: refractive index in thickness direction (8) Straight Cuttability The straight cuttability indicates a performance of being able to be straightly torn parallelly to one direction when a multilayer body is torn. Measurement was performed through the following method. In each of examples and comparative examples, straight cuttability in the stretching direction is exhibited, and thus measurement in the stretching direction was performed.

A strip measuring 150 mm in the stretching direction and measuring 60 mm in a direction perpendicular to the measurement direction was cut out from a multilayer body, and a slit measuring 30 mm was formed, along the measurement direction, from a center portion of a short side of the strip. The sample was torn according to JIS K 7128-1: 1998. When the sample was torn by 120 mm in the stretching direction without inclusion of the slit measuring 30 mm, the distance over which movement occurred in a direction perpendicular to the stretching direction was measured, and the absolute value of the distance was recorded. In each of a case where the right side of the slice (when the slice was viewed) was sandwiched by a gripper on the upper side and a case where the left side of the slice (when the slice was viewed) was sandwiched by the gripper on the upper side, the measurement was performed with N being 3. Average values in the respective cases were calculated. Out of the measurement results regarding the right side and the left side, the larger numerical value was used.

(9) Retort Shrinkage Rate

A portion having four sides each measuring 120 mm was cut out from a multilayer body of a polyolefin-based resin sealant film and a nylon film. Reference lines were drawn at an interval of 100 mm in each of the MD direction and the TD direction. Retorting treatment with hot water was performed at 121° C. for 30 minutes. The distance between the reference lines was measured, and the retort shrinkage rate was measured according to the following expression 4. Each time of measurement was performed with N being 3, and an average value was calculated.

$$\text{Retort shrinkage rate} = \text{(pre-treatment reference line length} - \text{post-treatment reference line length)} / \text{pre-treatment reference line length} \times 100(\%) \quad \text{(expression 4)}$$

(10) Heat-Sealing Start Temperature

The heat-sealing start temperature of a multilayer body of a polyolefin-based resin sealant film, and a polyethylene terephthalate film and an aluminum foil, was measured according to JIS Z 1713 (2009). At this time, the film was cut into test pieces (to be heat-sealed) that each had a rectangular shape measuring 50 mm in the width direction of the film and measuring 250 mm in the longitudinal direction of the film. The sealing layers of two of the test pieces were superposed on each other, and a thermal gradient tester (heat sealing tester) manufactured by Toyo Seiki Seisaku-sho, Ltd., was used, with the heat sealing pressure being set to 0.2 MPa and the heat sealing time being set to 1.0 second. Then, heat sealing was performed under the condition of a gradient at which the temperature is increased by 5° C. every time. After the heat sealing, a test piece having a width of 15 mm was cut out. The test piece in which fusing had been achieved through heat sealing was opened at 180°, an unsealed portion was sandwiched by a chuck, and a sealed portion was peeled. Then, a heat sealing temperature at a temperature immediately before the heat sealing strength exceeded 30 N, and a heat sealing temperature at a temperature immediately after the heat sealing strength exceeded 30 N, were weight-averaged to calculate a heat-sealing start temperature. A universal material tester 5965 manufactured by Illinois Tool Works Inc., was used as a tester. The test speed was set to 200 mm/minute. Measurement was performed with N being 5, and an average value was calculated.

(11) Heat Sealing Strength

Heat sealing conditions and strength measurement conditions are as follows. That is, multilayer bodies each including a polyolefin-based resin sealant film, and a polyethylene terephthalate film and an aluminum foil, were obtained in each of the examples and comparative examples. The multilayer bodies had the polyolefin-based resin sealant film sides thereof superposed on each other and were heat-sealed for 1 second at a pressure of 0.2 MPa and at a heat sealing temperature of 220° C. by using a sealing bar having a width of 10 mm. Then, multilayer bodies were left to be cooled. Then, retorting treatment with hot water was performed at 121° C. for 30 minutes. Test pieces measuring 80 mm in the MD direction and measuring 15 mm in the TD direction were cut out from films having been heat-sealed at respective temperatures, and the peel strength of each of the test pieces when a heat-sealed portion was peeled at a crosshead speed of 200 mm/minute was measured. A universal material tester 5965 manufactured by Illinois Tool Works Inc., was used as a tester. Each time of measurement was performed with N being 3 times, and an average value was calculated.

(12) Distance Between Opening Ends

Heat sealing films of multilayer bodies were located so as to face each other and were heat-sealed to create a four-side sealed bag having internal dimensions of 120 mm in the longitudinal direction and 170 mm in the width direction. A notch was formed at each end of the four-side sealed bag, and tearing was performed in the longitudinal direction with hands. The cutting was advanced to the opposite end, and, at the center in the cutting direction (at a position apart from the end in the internal dimension by 60 mm), the tearing line displacement between the films on the front side and the back side of the bag was measured. In each of the direction in which the right hand side was the near side and the direction in which the left hand side was the near side, measurement was performed with N being 3, an average value was calculated, and the larger measurement value was used.

(13) Openability

A package was produced through the same method as the aforementioned method for evaluating the distance between opening ends and was opened from a notch by being torn in the longitudinal direction. Evaluation was performed as to whether an opening can easily be formed by hooking a finger at an opening end of the package.

Good: An opening can be formed by naturally hooking a finger at an opening end.

Poor: An opening can be formed by inserting a fingernail in the opening end.

Bad: A fingernail cannot be inserted in the opening end.

(14) Extent of Parting

Heat sealing films of multilayer bodies were located so as to face each other and were heat-sealed to create a four-side sealed bag having internal dimensions of 120 mm in the longitudinal direction and 170 mm in the width direction. A notch was formed at each end of the four-side sealed bag, and tearing was performed in the longitudinal direction with hands. The cutting was advanced to the opposite end, and the tearing line displacement between the films on the front side and the back side of the bag was measured. In each of the direction in which the right hand side was the near side and the direction in which the left hand side was the near side, measurement was performed with N being 3, an average value was calculated, and the larger measurement value was used.

(15) Bag-Production Finish

Multilayer bodies had polyolefin-based resin sealant film sides thereof superposed on each other and were heat-sealed for 1 second at a pressure of 0.2 MPa and at a heat sealing temperature of 220° C. by using a sealing bar having a width of 10 mm, to create a four-side sealed bag having internal dimensions of 120 mm in the longitudinal direction and 170 mm in the width direction. The finished state of the four-side sealed bag was visually checked.

Good: There is no distortion near a heat-sealed portion, with the bag having a complete rectangular shape.

Poor: There is a small extent of distortion near the heat-sealed portion.

Bad: There is a large extent of distortion near the heat-sealed portion, with an edge of the bag becoming wavy.

(16) Orientation Angle

The orientation angle (degrees) of a base material film was measured by using a molecular orientation meter MOA-6004 manufactured by Oji Scientific Instruments. A sample measuring 120 mm in the longitudinal direction and 100 mm in the width direction was cut out and set on a measuring instrument, and the value of a measured angle was regarded as an orientation angle. The longitudinal direction was defined as 0°, the clockwise direction was defined as +(plus), and the anticlockwise direction was defined as − (minus). Measurement was performed with N being 3, and an average value was calculated. However, in a case where the value of the angle is not smaller than +45 degrees or not larger than −45 degrees, the angle of a sub-axis is treated as an orientation angle according to the following expression.

Not smaller than 45 degrees: orientation angle=angle−90 (degrees)

Not larger than −45 degrees: orientation angle=angle+90 (degrees)

(17) Melting Point

A DSC curve of a polyolefin-based resin sealant film was obtained by using a Shimadzu differential scanning calorimeter DSC-60 manufactured by Shimadzu Corporation, and a temperature at the maximum melting peak in the DSC curve was regarded as a melting point. The start temperature was set to 30° C., the temperature increase rate was set to 5° C./minute, and the end temperature was set to 180° C. Measurement was performed with N being 3, and an average value was calculated.

Examples (Sealant Films)
(Raw Materials Used)

For each of polypropylene-based resin sealant films as a sealant A to a sealant F, raw materials were adjusted on the basis of the corresponding resin composition and the proportions in the resin composition which are indicated in either of Table 2 and Table 3 described later. These raw materials were mixed so as to be even, to obtain a raw material mixture for producing the polyolefin-based resin sealant film.

1) Raw material A: a propylene-ethylene block copolymer WFS5293-22 (having an ethylene content of 7% by weight, a resin density of 891 kg/m$^3$, an MFR, at 230° C. and under 2.16 kg, of 3.0 g/10 minutes, and a melting point of 164° C.) manufactured by Sumitomo Chemical Co., Ltd.

2) Raw material B: a propylene-ethylene random copolymer TI640 (having a resin density of 900 kg/m$^3$, an MFR, at 230° C. and under 2.16 kg, of 5.0 g/10 minutes, and a melting point of 143° C.) manufactured by LOTTE CHEMICAL CO., LTD.

3) Raw material C: a propylene-ethylene random copolymer S131 (manufactured with a Ziegler-Natta catalyst and having an ethylene content of 5.5% by weight, a resin density of 890 kg/m$^3$, an MFR, at 230° C. and under 2.16 kg, of 1.5 g/10 minutes, and a melting point of 132° C.) manufactured by Sumitomo Chemical Co., Ltd.

4) Raw material D: an ethylene-propylene copolymer elastomer TAFMER P0480 (having a propylene content of 27% by weight, a resin density of 870 kg/m$^3$, an MFR, at 230° C. and under 2.16 kg, of 1.8 g/10 minutes, and a melting point of 48° C.) manufactured by Mitsui Chemicals, Inc.

6) Raw material E: a copolymerization ethylene-butene elastomer TAFMER A1085S (having a butene content of 18% by weight, a resin density of 885 kg/m$^3$, an MFR, at 230° C. and under 2.16 kg, of 6.7 g/10 minutes, and a melting point of 66° C.) manufactured by Mitsui Chemicals, Inc.

(Melt-Extrusion)

A raw material mixture based on each of the resin compositions and the proportions in the resin composition which are indicated in either of Table 2 and Table 3 was introduced, by using a three-stage single-screw extruder having a screw diameter of 90 mm, into a T-slot die designed such that: a preland was formed in two stages so as to have a width of 800 mm; and the shape of a step portion was curved so as to cause the flow of melted resin to be even, to cause the flow in the die to be even. Extrusion was performed with the outlet temperature of the die being 230° C.

(Cooling)

The melted resin sheet having been extruded from the die was cooled by a cooling roll at 25° C., whereby an unstretched polyolefin-based resin sealant film having a thickness of 210 µm was obtained. At the time of cooling by the cooling roll, both ends of the film on the cooling roll were fixed by air nozzles, the melted resin sheet was, over the entire width thereof, pressed against the cooling roll by air knife, and a vacuum chamber was activated simultaneously. Consequently, air entrapment between the melted resin sheet and the cooling roll was prevented. The air nozzles were disposed so as to be in series in the film advancement direction at both ends thereof. The die was surrounded by a sheet so as to prevent the melted resin sheet from being exposed to wind.

1) Sealant A
(Preheating)

The relevant unstretched sheet was introduced to a heated roll group, and the sheet was brought into contact with the rolls, to preheat the sheet. The temperature of a preheating roll was set to 105° C. A plurality of the rolls were used to preheat both surfaces of the film.

(Longitudinal Stretching)

The unstretched sheet was introduced to a longitudinal stretching machine and stretched 3.5-fold according to the difference between roll speeds so as to have a thickness of 60 µm. The temperature of each stretching roll was set to 105° C.

(Annealing Treatment)

The stretched sheet was heated at 130° C. by using an annealing roll. A plurality of the rolls were used to heat both surfaces of the film.

(Relaxation Step)

The speed of a roll installed downstream of the annealing rolls was decreased by, as a relaxation rate, 5% relative to the speeds of the annealing rolls, whereby the film was subjected to relaxation.

(Corona Treatment)

Corona treatment (with a power density of 20 W·min/m$^2$) was performed on the surface of a laminate layer of the film.

(Winding)

Winding was performed at a film production speed of 20 m/minute. An ear portion of the produced film was trimmed, and the film was wound into the form of a roll.

2) Sealant B

According to the relevant raw material formula indicated in Table 2, a 60-μm sealant film was produced through the same method as that for the sealant A, except that: the thickness of the unstretched film was set to 270 μm; and the stretch ratio for the unstretched film was set to 4.5-fold.

3) Sealant C

According to the relevant raw material formula indicated in Table 2, erucic acid amide as an organic lubricant and a silica having an average particle diameter of 4 μm as an inorganic anti-blocking agent were added in the form of a masterbatch such that, with respect to the total amount (100 parts by weight) of a mixture of polypropylene-based resins, the erucic acid amide content and the silica content of the resin composition were respectively 320 ppm by weight and 2400 ppm by weight. These raw materials were mixed so as to be even, to obtain a raw material mixture for producing the polyolefin-based resin sealant film. A sealant film was produced through the same method as that for the sealant A, except that: this raw material mixture was used; and the annealing temperature was set to 120° C.

4) Sealant D

According to the relevant raw material formulas indicated in Table 3, a 60-μm unstretched sealant films were produced through the same method as that for the sealant A, except that none of preheating, stretching, annealing, and relaxation was performed.

5) Sealant E

According to the relevant raw material formula indicated in Table 3, a sealant film was produced through the same method as that for the sealant A, except that: the thickness of the unstretched film was set to 120 μm; and the stretch ratio for the unstretched film was set to 2.0-fold.

6) Sealant F

According to the raw material formula indicated in Table 3, a sealant film was produced through the same method as that for the sealant A, except that: the thickness of the unstretched film was set to 300 μm; and the stretch ratio for the unstretched film was set to 5.0-fold.

(Base Material Films)

The following films were prepared as base material films. The values of physical properties of each base material film are indicated in Table 1.

1) Base material film a: a 12-am biaxially stretched polyethylene terephthalate film E5102 (with an orientation angle of 12 degrees) manufactured by TOYOBO CO., LTD.

2) Base material film b: a 12-μm biaxially stretched polyethylene terephthalate film E5102 (with an orientation angle of 25 degrees) manufactured by TOYOBO CO., LTD.

3) Base material film c: a 12-μm biaxially stretched polyethylene terephthalate film E5102 (with an orientation angle of 39 degrees) manufactured by TOYOBO CO., LTD.

4) Base material film d: a 12-μm transparent vapor-deposited biaxially stretched polyethylene terephthalate film VE707 (with an orientation angle of −40 degrees) manufactured by TOYOBO CO., LTD.

5) Base material film e: a 15-μm biaxially stretched nylon 6 film N1102 (with an orientation angle of −29 degrees) manufactured by TOYOBO CO., LTD.

6) Base material film f: a 15-μm biaxially stretched nylon 6 film N1202 (with an orientation angle of 14 degrees) manufactured by TOYOBO CO., LTD.

7) Base material film g: a 15-μm biaxially stretched nylon 6 film N1202 (with an orientation angle of 31 degrees) manufactured by TOYOBO CO., LTD.

8) Base material film h: a 7-μm aluminum foil 1N30 manufactured by UACJ Corporation 9) Base material film i: a 12-μm biaxially stretched polyethylene terephthalate film E5104 (with an orientation angle of 8 degrees) manufactured by TOYOBO CO., LTD.

10) Base material film j: a 12-μm biaxially stretched nylon 6 film N1102 (with an orientation angle of 2 degrees) manufactured by TOYOBO CO., LTD.

10) Base material film j: a 12-μm biaxially stretched nylon 6 film N1102 (with an orientation angle of 2 degrees) manufactured by TOYOBO CO., LTD.

11) Base material film k: a 15-μm biaxially stretched nylon 6 film N1102 (with an orientation angle of 22 degrees) manufactured by TOYOBO CO., LTD.

(Production of Multilayer Bodies)

Example 1

An ester-based adhesive was obtained by mixing 33.6 parts by mass of a main agent (TM569 manufactured by Toyo-Morton, Ltd.), 4.0 parts by mass of a curing agent (CAT10L manufactured by Toyo-Morton, Ltd.), and 62.4 parts by mass of ethyl acetate, and the sealant A as a sealant film and the base material c as a base material film were dry-laminated through application of the ester-based adhesive onto the base material film such that the application amount of the adhesive was 3.0 g/m². The resultant laminate was wound, kept at 40° C., and aged for three days. Consequently, a multilayer body having two layers was obtained.

Example 2

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, Ltd.), and 62.4 parts by weight of ethyl acetate, and the base material film b and the base material film f were dry-laminated by using the ester-based adhesive such that the application amount of the adhesive was 3.0 g/m². Consequently, a multilayer body was obtained. Next, the base material film f side of the multilayer body and the sealant A were adhered to each other through the same method. The laminate film obtained by stacking was kept at 40° C. and aged for three days. Consequently, a multilayer body having three layers was obtained.

Example 3

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film b and the base material film h were dry-laminated by using the ester-based adhesive such that the application amount of the adhesive was 3.0 g/m². Consequently, a multilayer body was obtained. Next, the base material film h side of the multilayer body and the sealant A were adhered to each other through the same method. The laminated film obtained by stacking was kept at 40° C. and aged for three days. Consequently, a multilayer body having three layers was obtained.

Example 4

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film a and the base material film h were dry-laminated by using the ester-based adhesive such that the application amount of the adhesive was 3.0 g/m$^2$. Consequently, a multilayer body was obtained. Next, the base material film h side of the multilayer body and the base material film f were adhered to each other through the same method to obtain a three-layered multilayer body. Next, the base material film f side of the three-layered multilayer body and the sealant A were adhered to each other through the same method. The laminated film obtained by stacking was kept at 40° C. and aged for three days. Consequently, a multilayer body having four layers was obtained.

Example 5

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film a and the base material film h were dry-laminated by using the ester-based adhesive such that the application amount of the adhesive was 3.0 g/m$^2$. Consequently, a multilayer body was obtained. Next, the base material film h side of the multilayer body and the base material film g were adhered to each other through the same method to obtain a three-layered multilayer body. Next, the base material film g side of the three-layered multilayer body and the sealant A were adhered to each other through the same method. The laminated film obtained by stacking was kept at 40° C. and aged for three days. Consequently, a multilayer body having four layers was obtained.

Example 6

An ester-based adhesive was obtained by mixing 33.6 parts by mass of a main agent (TM569 manufactured by Toyo-Morton, Ltd.), 4.0 parts by mass of a curing agent (CAT10L manufactured by Toyo-Morton, Ltd.), and 62.4 parts by mass of ethyl acetate, and the sealant A as a sealant film and the base material e as a base material film were dry-laminated through application of the ester-based adhesive onto the base material film such that the application amount of the adhesive was 3.0 g/m$^2$. The resultant laminate was wound, kept at 40° C., and aged for three days. Consequently, a multilayer body having two layers was obtained.

Example 7

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film d and the base material film g were dry-laminated by using the ester-based adhesive such that the application amount of the adhesive was 3.0 g/m$^2$. Consequently, a multilayer body was obtained. Next, the base material film g side of the multilayer body and the sealant A were adhered to each other through the same method. The laminated film obtained by stacking was kept at 40° C. and aged for three days. Consequently, a multilayer body having three layers was obtained.

Example 8

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film c and the base material film g were dry-laminated by using the ester-based adhesive such that the application amount of the adhesive was 3.0 g/m$^2$. Consequently, a multilayer body was obtained. Next, the base material film g side of the multilayer body and the sealant B were adhered to each other through the same method. The laminated film obtained by stacking was kept at 40° C. and aged for three days. Consequently, a multilayer body having three layers was obtained.

Example 9

An ester-based adhesive was obtained by mixing 33.6 parts by mass of a main agent (TM569 manufactured by Toyo-Morton, Ltd.), 4.0 parts by mass of a curing agent (CAT10L manufactured by Toyo-Morton, Ltd.), and 62.4 parts by mass of ethyl acetate, and the sealant C as a sealant film and the base material e as a base material film were dry-laminated through application of the ester-based adhesive onto the base material film such that the application amount of the adhesive was 3.0 g/m$^2$. The resultant laminate was wound, kept at 40° C., and aged for three days. Consequently, a multilayer body having two layers was obtained.

Comparative Example 1

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film i and the base material film h were dry-laminated by using the ester-based adhesive such that the application amount of the adhesive was 3.0 g/m$^2$. Consequently, a multilayer body was obtained. Next, the base material film h side of the multilayer body and the sealant A were adhered to each other through the same method. The laminated film obtained by stacking was kept at 40° C. and aged for three days. Consequently, a multilayer body having three layers was obtained.

Comparative Example 2

An ester-based adhesive was obtained by mixing 33.6 parts by mass of a main agent (TM569 manufactured by Toyo-Morton, Ltd.), 4.0 parts by mass of a curing agent (CAT10L manufactured by Toyo-Morton, Ltd.), and 62.4 parts by mass of ethyl acetate, and the sealant A as a sealant film and the base material j as a base material film were dry-laminated through application of the ester-based adhesive onto the base material film such that the application amount of the adhesive was 3.0 g/m². The resultant laminate was wound, kept at 40° C., and aged for three days. Consequently, a multilayer body having two layers was obtained.

Comparative Example 3

An ester-based adhesive was obtained by mixing 33.6 parts by mass of a main agent (TM569 manufactured by Toyo-Morton, Ltd.), 4.0 parts by mass of a curing agent (CAT10L manufactured by Toyo-Morton, Ltd.), and 62.4 parts by mass of ethyl acetate, and the sealant A as a sealant film and the base material k as a base material film were dry-laminated through application of the ester-based adhesive onto the base material film such that the application amount of the adhesive was 3.0 g/m². The resultant laminate was wound, kept at 40° C., and aged for three days. Consequently, a multilayer body having two layers was obtained.

Comparative Example 4

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film a and the base material film h were dry-laminated by using the ester-based adhesive such that the application amount of the adhesive was 3.0 g/m². Consequently, a multilayer body was obtained. Next, the base material film h side of the multilayer body and the base material film e were adhered to each other through the same method to obtain a three-layered multilayer body. Next, the base material film e side of the three-layered multilayer body and the sealant D were adhered to each other through the same method. The laminated film obtained by stacking was kept at 40° C. and aged for three days. Consequently, a multilayer body having four layers was obtained.

Comparative Example 5

An ester-based adhesive was obtained by mixing 33.6 parts by mass of a main agent (TM569 manufactured by Toyo-Morton, Ltd.), 4.0 parts by mass of a curing agent (CAT10L manufactured by Toyo-Morton, Ltd.), and 62.4 parts by mass of ethyl acetate, and the sealant D as a sealant film and the base material e as a base material film were dry-laminated through application of the ester-based adhesive onto the base material film such that the application amount of the adhesive was 3.0 g/m². The resultant laminate was wound, kept at 40° C., and aged for three days. Consequently, a multilayer body having two layers was obtained.

Comparative Example 6

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film b and the base material film h were dry-laminated by using the ester-based adhesive such that the application amount of the adhesive was 3.0 g/m². Consequently, a multilayer body was obtained. Next, the base material film h side of the multilayer body and the sealant E were adhered to each other through the same method. The laminated film obtained by stacking was kept at 40° C. and aged for three days. Consequently, a multilayer body having three layers was obtained.

Comparative Example 7

An ester-based adhesive was obtained by mixing 33.6 parts by weight of an ester-based dry lamination adhesive (TM569 manufactured by Toyo-Morton, Ltd.), 4.0 parts by weight of a curing agent (CAT10L manufactured by Toyo-Morton, LTD.), and 62.4 parts by weight of ethyl acetate, and the base material film b and the base material film h were dry-laminated by using the ester-based adhesive such that the application amount of the adhesive was 3.0 g/m². Consequently, a multilayer body was obtained. Next, the base material film f side of the multilayer body and the sealant F were adhered to each other through the same method. The laminated film obtained by stacking was kept at 40° C. and aged for three days. Consequently, a multilayer body having three layers was obtained.

The above results are shown in Tables 2 and Table 3.

In comparative example 1 and comparative example 2, the orientation angles of the base material films were small, and thus inferiority in the openabilities occurred.

In comparative example 3, the orientation angle of the base material film was small, and thus inferiority in the openability occurred.

In comparative example 4, comparative example 5, and comparative example 6, the orientation coefficients in the longitudinal direction of the sealant films were small, and thus inferiority in the extent of parting occurred.

In comparative example 7, the orientation coefficient in the longitudinal direction of the sealant was large, and thus inferiority in the heat sealing strength occurred.

TABLE 1

|  |  | Base material film a | Base material film b | Base material film c | Base material film d | Base material film e | Base material film f | Base material film g | Base material film h | Base material film i | Base material film j | Base material film k |
|---|---|---|---|---|---|---|---|---|---|---|---|---|
| Material |  | PET | PET | PET | Vapor-deposited PET | Nylon | Nylon | Nylon | Aluminum foil | PET | Nylon | Nylon |
| Thickness | μm | 12 | 12 | 12 | 12 | 15 | 15 | 15 | 7 | 12 | 15 | 15 |
| Orientation angle | degree | 12 | 25 | 39 | −40 | −29 | 14 | 31 | — | 4 | 2 | 22 |
| Tearing strength (longitudinal direction) | mN | 123 | 131 | 145 | 142 | 111 | 108 | 126 | 47 | 106 | 98 | 98 |
| Tearing strength (width direction) | mN | 94 | 95 | 108 | 103 | 84 | 84 | 88 | 34 | 88 | 71 | 79 |

PET: polyethylene terephthalate

TABLE 2

| | | | Example 1 | Example 2 | Example 3 | Example 4 | Example 5 |
|---|---|---|---|---|---|---|---|
| Base material film | Base material 1 Material (thickness: μm) Orientation angle (degree) | | Base material c PET(12) 39 | Base material b PET(12) 25 | Base material b PET(12) 25 | Base material a PET(12) 12 | Base material a PET(12) 25 |
| | Base material 2 Material (thickness: μm) Orientation angle (degree) | | | Base material f Nylon (15) 14 | Base material h Aluminum foil (7) — | Base material h Aluminum foil (7) — | Base material h Aluminum foil (7) — |
| | Base material 3 Material (thickness: μm) Orientation angle (degree) | | | | | Base material f Nylon (15) 14 | Base material g Nylon (15) 31 |
| | Sum of absolute values of orientation angles (degree) | | 39 | 39 | 25 | 26 | 56 |
| Manufactuing conditions of sealant Characteristics | Type of sealant film | | Sealant A | Sealant A | Sealant A | Sealant A | Sealant A |
| | Material A | parts by weight | 64 | 64 | 64 | 64 | 64 |
| | Material B | parts by weight | — | — | — | — | — |
| | Material C | parts by weight | 30 | 30 | 30 | 30 | 30 |
| | Material D | parts by weight | 6 | 6 | 6 | 6 | 6 |
| | Material E | parts by weight | — | — | — | — | — |
| | Anti-blocking agent | ppm | — | — | — | — | — |
| | Organic lubricant | ppm | — | — | — | — | — |
| | Stretching direction | — | Longitudinally uniaxial | Longitudinally uniaxial | Longitudinally uniaxial | Longitudinally uniaxial | Longitudinally uniaxial |
| | Stretch ratio of sealant | — | 3.5 | 3.5 | 3.5 | 3.5 | 3.5 |
| | Annealing temperature | °C. | 130 | 130 | 130 | 130 | 130 |
| | Thickness | μm | 60 | 60 | 60 | 60 | 60 |
| | Haze | % | 42.4 | 42.4 | 42.4 | 42.4 | 42.4 |
| | Heat shrinkage rate longitudinal direction | % | 5.1 | 5.1 | 5.1 | 5.1 | 5.1 |
| | Heat shrinkage rate width direction | % | 0.2 | 0.2 | 0.2 | 0.2 | 0.2 |
| | Tearing strength longitudinal direction | mN | 174 | 174 | 174 | 174 | 174 |
| | Tearing strength width direction | mN | *unmeasurable | *unmeasurable | *unmeasurable | *unmeasurable | *unmeasurable |
| | Piercing strength | N | 8.9 | 8.9 | 8.9 | 8.9 | 8.9 |
| | Piercing strength | N/μm | 0.15 | 0.15 | 0.15 | 0.15 | 0.15 |
| | Wetting tension | mN/m | 42 | 42 | 42 | 42 | 42 |
| | Orientation coefficient in longitudinal direction $\Delta Nx$ | — | 0.0214 | 0.0214 | 0.0214 | 0.0214 | 0.0214 |
| | Plane orientation coefficient $\Delta P$ | — | 0.0112 | 0.0112 | 0.0112 | 0.0112 | 0.0112 |
| Multilayer body | Straight cuttability | mm | 2 | 3 | 2 | 2 | 4 |
| | Retort shrinkage rate longitudinal direction | % | 0.5 | 1.3 | 0.4 | 0.4 | 0.5 |
| | Retort shrinkage rate width direction | % | 0.1 | 0.6 | 0.1 | 0.1 | 0.1 |
| | Piercing strength | N | 12.5 | 27.8 | 15.4 | 28.0 | 28.1 |
| | Tearing strength longitudinal direction | mN | 408 | 551 | 386 | 648 | 844 |
| | Heat-sealing start temperature | °C. | 185 | 186 | 186 | 187 | 189 |
| | Heat-sealing strength | N/15 mm | 41 | 44 | 45 | 48 | 47 |
| Package | Distance between opening ends | mm | 2.0 | 2.3 | 1.5 | 2.4 | 2.8 |
| | Parting | mm | 4 | 5 | 3 | 2 | 4 |
| | Bag-production finish | — | Good | Good | Good | Good | Good |
| | Openability | — | Good | Good | Good | Good | Good |

TABLE 2-continued

|  |  |  | Example 6 | Example 7 | Example 8 | Example 9 |
|---|---|---|---|---|---|---|
| Base material film | Base material 1 Material (thickness: μm) Orientation angle (degree) | | Base material e Nylon (15) −29 | Base material d Vapor-deposited PET (12) −40 | Base material c PET(12) 39 | Base material e Nylon(15) −29 |
| | Base material 2 Material (thickness: μm) Orientation angle (degree) | | | | Base material g Nylon (15) 31 | Base material g Nylon (15) 31 |
| | Base material 3 Material (thickness: μm) Orientation angle (degree) | | | | | |
| | Sum of absolute values of orientation angles (degree) | | 29 | 71 | 70 | 29 |
| Manufactuing conditions of sealant | Type of sealant film | | Sealant A | Sealant A | Sealant B | Sealant C |
| | Material A | parts by weight | 64 | 64 | 64 | — |
| Characteristics | Material B | parts by weight | — | — | — | 65 |
| | Material C | parts by weight | 30 | 30 | 30 | 30 |
| | Material D | parts by weight | 6 | 6 | 6 | — |
| | Material E | parts by weight | — | — | — | 5 |
| | Anti-blocking agent | ppm | — | — | — | 2400 |
| | Organic lubricant | ppm | — | — | — | 320 |
| | Stretching direction | — | Longitudinally uniaxial | Longitudinally uniaxial | Longitudinally uniaxial | Longitudinally uniaxial |
| | Stretch ratio of sealant | — | 3.5 | 3.5 | 4.5 | 3.5 |
| | Annealing temperature | ° C. | 130 | 130 | 120 | 130 |
| | Thickness | μm | 60 | 60 | 60 | 60 |
| | Haze | % | 42.4 | 42.4 | 50.3 | 10.5 |
| | Heat shrinkage rate longitudinal direction | % | 5.1 | 5.1 | 5.8 | 6.4 |
| | Heat shrinkage rate width direction | % | 0.2 | 0.2 | 0.1 | 1.5 |
| | Tearing strength longitudinal direction | mN | 174 | 174 | 127 | 433 |
| | Tearing strength width direction | mN | *unmeasurable | *unmeasurable | *unmeasurable | 9219 |
| | Piercing strength | N | 8.9 | 8.9 | 9.4 | 5.3 |
| | Piercing strength | N/μm | 0.15 | 0.15 | 0.16 | 0.09 |
| | Wetting tension | mN/m | 42 | 42 | 42 | 42 |
| | Orientation coefficient in longitudinal direction $\Delta Nx$ | — | 0.0214 | 0.0214 | 0.0228 | 0.0207 |
| | Plane orientation coefficient $\Delta P$ | — | 0.0112 | 0.0112 | 0.0128 | 0.0107 |
| Multilayer body | Straight cuttability | mm | 2 | 2 | 2 | 7 |
| | Retort shrinkage rate longitudinal direction | % | 3.3 | 1.1 | 3.3 | 3.1 |
| | Retort shrinkage rate width direction | % | 1.0 | 0.5 | 1.0 | 3.0 |
| | Piercing strength | N | 25.7 | 27.8 | 27.6 | 17.4 |
| | Tearing strength longitudinal direction | mN | 379 | 315 | 102 | 885 |
| | Heat-sealing start temperature | ° C. | 185 | 186 | 186 | 185 |
| | Heat-sealing strength | N/15 mm | 44 | 45 | 41 | 52 |
| Package | Distance between opening ends | mm | 1.6 | 2.3 | 2.5 | 1.9 |
| | Parting | mm | 4 | 4 | 4 | 5 |
| | Bag-production finish | — | Good | Good | Good | Good |
| | Openability | — | Good | Good | Good | Good |

*unmeasurable: meaning that the film was torn in the longitudinal direction during characterization and no measurement data could be obtained.
PET: polyethylene terephthalate

TABLE 3

| | | | Comparative example 1 | Comparative example 2 | Comparative example 3 | Comparative example 4 | Comparative example 5 | Comparative example 6 | Comparatie example 7 |
|---|---|---|---|---|---|---|---|---|---|
| Base material film | Base material 1 Material (thickness: μm) Orientation angle (degree) | | Base material i PET(12) 8 | Base material j Nylon (15) 2 | Base material k Nylon (15) 22 | Base material a PET(12) 12 | Base material e Nylon (15) −29 | Base material b PET(12) 25 | Base material b PET(12) 25 |
| | Base material 2 Material (thickness: μm) Orientation angle (degree) | | Base material h Aluminum foil (7) — | | | Base material h Aluminum foil (7) — | | Base material h Aluminum foil (7) — | Base material h Aluminum foil (7) — |
| | Base material 3 Material (thickness: μm) Orientation angle (degree) | | | | | Base material e Nylon (15) 14 | | | |
| | Sum of absolute values of orientation angles (degree) | | 8 | 2 | 22 | 26 | 29 | 25 | 25 |
| Manufactuing conditions of sealant Characteristics | Type of sealant film | | Sealant A | Sealant A | Sealant A | Sealant D | Sealant D | Sealant E | Sealant F |
| | Material A | parts by weight | 64 | 64 | 64 | 64 | 64 | 64 | 64 |
| | Material B | parts by weight | — | — | — | — | — | — | — |
| | Material C | parts by weight | 30 | 30 | 30 | 30 | 30 | 30 | 30 |
| | Material D | parts by weight | 6 | 6 | 6 | 6 | 6 | 6 | 6 |
| | Material E | parts by weight | — | — | — | — | — | — | — |
| | Anti-blocking agent | ppm | — | — | — | — | — | — | — |
| | Organic lubricant | ppm | — | — | — | — | — | — | — |
| | Stretching direction | — | Longitudinally uniaxial | Longitudinally uniaxial | Longitudinally uniaxial | unstretched | unstretched | Longitudinally uniaxial | Longitudinally uniaxial |
| | Stretch ratio of sealant | — | 3.5 | 3.5 | 3.5 | 1.0 | 1.0 | 2.0 | 5.0 |
| | Annealing temperature | °C. | 130 | 130 | 130 | — | — | 130 | 130 |
| | Thickness | μm | 60 | 60 | 60 | 60 | 60 | 60 | 60 |
| | Haze | % | 42.4 | 42.4 | 42.4 | 46.4 | 46.4 | 39.4 | 52.4 |
| | Heat shrinkage rate longitudinal direction | % | 5.1 | 5.1 | 5.1 | 0.2 | 0.2 | 3.8 | 9.3 |
| | Heat shrinkage rate width direction | % | 0.2 | 0.2 | 0.2 | 0.5 | 0.5 | 2.1 | 1.5 |
| | Tearing strength longitudinal direction | mN | 174 | 174 | 174 | 3362 | 3362 | 365 | 56 |
| | Tearing strength width direction | mN | *unmeasurable | *unmeasurable | *unmeasurable | 7865 | 7865 | 6241 | *unmeasurable |
| | Piercing strength | N | 8.9 | 8.9 | 8.9 | 2.9 | 2.9 | 6.1 | 9.6 |
| | Piercing strength | N/μm | 0.15 | 0.15 | 0.15 | 0.05 | 0.05 | 0.10 | 0.16 |
| | Wetting tension | mN/m | 42 | 42 | 42 | 42 | 42 | 42 | 42 |
| | Orientation coefficient in longitudinal direction ΔNx | — | 0.0208 | 0.0208 | 0.0208 | 0.0011 | 0.0011 | 0.0090 | 0.0242 |
| | Plane orientation coefficient ΔP | — | 0.0112 | 0.0112 | 0.0112 | 0.0002 | 0.0002 | 0.0060 | 0.0131 |
| Multilayer body | Straight cuttability | mm | 0 | 0 | 1 | 18 | 30 or more | 12 | 1 |
| | Retort shrinkage rate longitudinal direction | % | 0.3 | 3.5 | 3.7 | 0.2 | 2.1 | 0.2 | 0.7 |
| | Retort shrinkage rate width direction | % | 0.1 | 1.8 | 1.7 | 0.1 | 3.5 | 0.1 | 0.1 |
| | Piercing strength | N | 15.8 | 14.0 | 13.9 | 21.5 | 13.7 | 23.1 | 29.6 |
| | Tearing strength longitudinal direction | mN | 152 | 32 | 337 | 168 | 2148 | 247 | 322 |
| | Heat-sealing start temperature | °C. | 185 | 185 | 184 | 166 | 163 | 176 | 191 |
| | Heat-sealing strength | N/15 mm | 44 | 42 | 42 | 52 | 46 | 44 | 32 |
| Package | Distance between opening ends | mm | 0.1 | 0.3 | 0.8 | 18.6 | 32.4 | 15.7 | 1.0 |
| | Parting | mm | 0 | 0 | 3 | 34 | 67 | 28 | 3 |
| | Bag-production finish | — | Good | Good | Good | Good | Good | Good | Good |
| | Openability | — | Bad | Bad | Poor | Good | Good | Good | Poor |

*unmeasurable: meaning that the film was torn in the longitudinal direction during characterization and no measurement data could be obtained.
PET: polyethylene terephthalate In Table 2 and Table 3, the phrase "*Unable to be measured" as an evaluation result indicates that the film was torn in the stretching direction during the property evaluation, and no measurement value was obtained.

INDUSTRIAL APPLICABILITY

The present invention makes it possible to provide a package that has excellent transparency, sealability, bag producibility, and resistance to bag breakage and that is easily torn without parting. Thus, the present invention can significantly contribute to industries.

The invention claimed is:

1. A multilayer body comprising:
one or more types of base material films; and
a polyolefin-based resin sealant film made from a polyolefin-based resin composition containing a propylene-α-olefin random copolymer, wherein
the following conditions 1) to 3) are satisfied,
1) The one or more types of base material films have orientation angles, a sum of absolute values of which is not smaller than 25 degrees and not larger than 85 degrees,
2) The polyolefin-based resin sealant film has a piercing strength of not lower than 5.0 N and not higher than 15.0 N, and
3) The polyolefin-based resin sealant film has an orientation coefficient ΔNx, in a longitudinal direction, of not smaller than 0.0150 and not larger than 0.0230.

2. The multilayer body according to claim 1, wherein the polyolefin-based resin composition contains the propylene-α-olefin random copolymer and one or more types of elastomers selected from the group consisting of an ethylene-propylene copolymer elastomer, a propylene-butene copolymer elastomer, and an ethylene-butene copolymer elastomer.

3. The multilayer body according to claim 1, wherein the polyolefin-based resin composition contains a propylene-α-olefin random copolymer having a melting point of not lower than 120° C. and lower than 140° C., in an amount of not lower than 10 parts by weight and not higher than 40 parts by weight with respect to a total amount of 100 parts by weight of polyolefin-based resins that form the polyolefin-based resin composition.

4. The multilayer body according to claim 1, wherein the polyolefin-based resin composition contains a copolymer selected from the group consisting of a propylene-ethylene block copolymer and a propylene-α-olefin random copolymer having a melting point of not lower than 140° C., in an amount of not lower than 40 parts by weight and not higher than 85 parts by weight with respect to a total amount of 100 parts by weight of polyolefin-based resins that form the polyolefin-based resin composition.

5. The multilayer body according to claim 1, wherein the base material films are one or more types of base material films selected from the group consisting of a polyamide-based resin film, a polyester-based resin film, and a polypropylene-based resin film.

6. The multilayer body according to claim 1, wherein the multilayer body has a tear strength, in the longitudinal direction, of not lower than 100 mN and not higher than 1000 mN.

7. The multilayer body according to claim 6, wherein the multilayer body has a heat sealing strength of not lower than 35 N/15 mm.

8. A package comprising the multilayer body according to claim 1, wherein a distance between opening ends on a front surface and a back surface of the package when the package is opened by being torn in the longitudinal direction is not shorter than 1.0 mm and not longer than 10.0 mm.

9. The package according to claim 8, for use in retorting.

* * * * *